United States Patent
Morejon et al.

(10) Patent No.: US 11,017,467 B1
(45) Date of Patent: **\*May 25, 2021**

(54) SYSTEMS AND METHODS FOR MEASURING DATA QUALITY OVER TIME

(71) Applicant: FEDERAL HOME LOAN MORTGAGE CORPORATION, McLean, VA (US)

(72) Inventors: Geni Gomez Morejon, McLean, VA (US); Charles C. Mckinney, Washington, DC (US); Juan S. Vegega, Washington, DC (US); Claudio N. Silva, Bethesda, MD (US); Wisam Yaghi, Sterling, VA (US); Amit Prakash, Centreville, VA (US)

(73) Assignee: Federal Home Loan Mortgage Corporation (FREDDIE MAC), McLean, VA (US)

(*) Notice: Subject to any disclaimer, the term of this patent is extended or adjusted under 35 U.S.C. 154(b) by 412 days.

This patent is subject to a terminal disclaimer.

(21) Appl. No.: 15/675,644

(22) Filed: Aug. 11, 2017

Related U.S. Application Data

(63) Continuation of application No. 13/970,439, filed on Aug. 19, 2013, now Pat. No. 9,747,639, which is a
(Continued)

(51) Int. Cl.
*G06Q 40/00* (2012.01)
*G06Q 40/02* (2012.01)

(52) U.S. Cl.
CPC .................. *G06Q 40/025* (2013.01)

(58) Field of Classification Search
CPC ...... G06Q 40/025; G06Q 40/06; G06Q 30/06; G06Q 20/401; G06F 16/00; G06F 17/246
(Continued)

(56) References Cited

U.S. PATENT DOCUMENTS 6,029,144 A 2/2000 Barrett
7,174,340 B1 2/2007 Molesky
(Continued)

OTHER PUBLICATIONS

Loshin, David; "The Golden Rules", Intelligent Enterprise, May 9, 2002, pp. 41-45 (Year: 2002).*
(Continued)

*Primary Examiner* — Mohammad Z Shaikh
(74) *Attorney, Agent, or Firm* — Finnegan, Henderson, Farabow, Garrett & Dunner LLP

(57) ABSTRACT

Systems, methods, and computer-readable media are disclosed for evaluating data quality. An exemplary embodiment includes storing a plurality of records, the records sharing a common attribute, and reading first values for the common attribute corresponding to a first time period and second values for the common attribute corresponding to a second time period. A business rule for evaluating the common attribute is accessed, and first and second consistency data are generated. The first consistency data may reflect the extent to which the first values of the common attribute are consistent with the business rule at the first time. The second consistency data may reflect the extent to which the second values of the common attribute are consistent with the business rule at the second time. The first consistency data and the second consistency data are processed to generate a quality change rate of the common attribute from the first time period to the second time period, based on the difference between the first consistency data and the second consistency data.

36 Claims, 13 Drawing Sheets

Related U.S. Application Data continuation of application No. 12/873,405, filed on Sep. 1, 2010, now Pat. No. 8,515,863.

(58) Field of Classification Search
USPC ...................................................... 705/35–45
See application file for complete search history.

(56) References Cited

U.S. PATENT DOCUMENTS

| | | | |
|---|---|---|---|
| 7,311,248 B1 | 12/2007 | Halvorson et al. | |
| 7,373,669 B2 * | 5/2008 | Eisen ..................... | G06Q 40/02 726/26 |
| 7,505,868 B1 * | 3/2009 | Shan ................... | G06F 11/0727 702/182 |
| 7,546,271 B1 * | 6/2009 | Chmielewski ..... | G06Q 30/0185 705/35 |
| 7,587,348 B2 | 9/2009 | Liao et al. | |
| 7,599,882 B2 | 10/2009 | Cagan | |
| 7,693,764 B1 * | 4/2010 | Gordon ................. | G06Q 20/10 705/35 |
| 7,720,822 B1 | 5/2010 | Sengupta | |
| 7,729,961 B1 * | 6/2010 | Gomez ................. | G06Q 40/02 705/30 |
| 7,739,189 B1 * | 6/2010 | Rosenblatt ............ | G06Q 40/00 235/376 |
| 7,860,787 B2 | 12/2010 | Oppenheimer | |
| 7,912,773 B1 | 3/2011 | Subramanian et al. | |
| 7,966,256 B2 | 6/2011 | Liao et al. | |
| 8,024,265 B2 | 9/2011 | Kemper | |
| 8,065,211 B2 | 11/2011 | Kemper | |
| 8,065,234 B2 | 11/2011 | Liao et al. | |
| 8,121,920 B1 | 2/2012 | Liao et al. | |
| 8,170,998 B2 * | 5/2012 | Churi .................... | G06Q 30/02 707/690 |
| 8,386,378 B2 | 2/2013 | Halper et al. | |
| 8,473,409 B2 | 6/2013 | Erbey | |
| 8,515,861 B2 | 8/2013 | Gang | |
| 8,515,863 B1 * | 8/2013 | Morejon ................ | G06Q 40/02 705/38 |
| 8,571,974 B1 | 10/2013 | Coleman | |
| 8,626,647 B1 | 1/2014 | Trimble, Jr. et al. | |
| 8,688,507 B2 * | 4/2014 | Kennis .................. | G06Q 40/00 705/7.37 |
| 8,935,379 B1 * | 1/2015 | Martignoni ............ | H04L 67/12 709/224 |
| 9,747,639 B1 * | 8/2017 | Morejon ............... | G06Q 40/025 |
| 2001/0034701 A1 | 10/2001 | Fox | |
| 2002/0133371 A1 * | 9/2002 | Cole ...................... | G06Q 40/02 705/38 |
| 2003/0093366 A1 * | 5/2003 | Halper .................. | G06Q 40/02 705/38 |
| 2004/0030649 A1 | 2/2004 | Nelson et al. | |
| 2004/0064401 A1 | 4/2004 | Palaghita et al. | |
| 2004/0078296 A1 | 4/2004 | Dykes | |
| 2004/0083164 A1 * | 4/2004 | Schwartz ............... | G06Q 10/10 705/38 |
| 2005/0097051 A1 | 5/2005 | Madill et al. | |
| 2005/0102225 A1 * | 5/2005 | Oppenheimer ...... | G06Q 40/025 705/38 |
| 2005/0102325 A1 * | 5/2005 | Gould ................. | G06F 16/24554 |
| 2005/0108025 A1 * | 5/2005 | Cagan .................. | G06Q 30/018 705/38 |
| 2005/0108631 A1 * | 5/2005 | Amorin ................. | G06Q 10/00 715/234 |
| 2005/0154665 A1 | 7/2005 | Kerr | |
| 2005/0187863 A1 | 8/2005 | Whinery et al. | |
| 2006/0218079 A1 | 9/2006 | Goldblatt et al. | |
| 2006/0224499 A1 * | 10/2006 | Graboske ............. | G06Q 40/025 705/38 |
| 2006/0259420 A1 | 11/2006 | Schaffer | |
| 2007/0174214 A1 | 7/2007 | Welsh et al. | |
| 2007/0192240 A1 | 8/2007 | Crooks | |
| 2007/0219819 A1 | 9/2007 | Campbell et al. | |
| 2007/0226129 A1 * | 9/2007 | Liao ....................... | G06Q 20/10 705/38 |
| 2008/0021801 A1 | 1/2008 | Song et al. | |
| 2008/0021815 A1 * | 1/2008 | Erbey .................... | G06Q 20/10 705/38 |
| 2008/0147454 A1 * | 6/2008 | Walker .................. | G06Q 40/00 705/35 |
| 2008/0167883 A1 | 7/2008 | Thavildar Khazaneh | |
| 2008/0201190 A1 | 8/2008 | Compton | |
| 2008/0222028 A1 * | 9/2008 | Santiago .............. | G06Q 40/025 705/38 |
| 2009/0099959 A1 | 4/2009 | Liao et al. | |
| 2009/0164232 A1 | 6/2009 | Chmielewski et al. | |
| 2010/0042454 A1 | 2/2010 | Liao et al. | |
| 2010/0088242 A1 | 4/2010 | Cagan | |
| 2010/0241558 A1 | 9/2010 | Chmielewski et al. | |
| 2010/0325035 A1 * | 12/2010 | Hilgers ................. | G06Q 10/10 705/38 |
| 2011/0078073 A1 | 3/2011 | Annappindi | |
| 2011/0099099 A1 | 4/2011 | Rivest | |
| 2011/0173116 A1 * | 7/2011 | Yan ...................... | G06Q 10/067 705/38 |
| 2011/0270779 A1 * | 11/2011 | Showalter ............ | G06Q 40/06 705/36 R |

OTHER PUBLICATIONS

Paulsen, Daley, Linda, "Data Quality: A Rising E-business concern", IT Pro, Aug. 2000, pp. 10-14 (Year: 2000).*

Kersnar, Scott, "First American to Test Fraud Smarts", National Mortgage News, 29.27 (Mar. 28, 2006), pp. 1-2.

"2007 Risk Metrics Validation Study;" Interthinx, and ISO Company; 2007; pp. 1-6.

Subar, David, "The New Battle Against Fraud", Mortgage Banking, Mar. 2007, pp. 1-5.

Carswell, T. Andrew; Bachtel, C. Douglas, "Mortgage fraud: A risk factor analysis of affected communities", Crime Law Soc Change, published online Jan. 16, 2009, pp. 1-19.

Anonymous, "The First American Corporation; First American CoreLogic's Newest Advanced Fraud Detection Solution Implemented by Top Lender", Real Estate Weekly News (Apr. 23, 2010), pp. 1-2.

Scott, Kersnar, "Centralizing the Process: Freddi Mac is Using Business Rules to Speed up Loan Purchases," Mortgage Technology, vol. 12, Issue 7, pp. 62-66 (Oct. 2005).

Steele, Georgia, "DocsDirect Delivers: The DocsDirect System Sets out to Streamline the Closing Process by Reducing Errors, Saving the Lender Both Time and Millions,"*Mortgage Technology*, vol. 11, Issue 2, pp. 32-26 (Mar. 2004).

Harmon, Jennifer, "Foreclosure Data Differs," National Mortgage News, vol. 32, Issue 25, pp. 1-2 (Mar. 24, 2008).

De Reza, Chris, "Glitch-proof Gains in Loan Servicing," Real Estate Finance Today, vol. 17, Issue. 27, pp. 1-3 (Jul. 17, 2000).

* cited by examiner

| Data Source 201 | Loan Number 202 | Loan Code 203 | Original Loan Balance 204 | Borrower Income 205 | Original LTV 206 | Current Balance 207 | Current LTV 208 | Month Funded 209 | Months After Funding 210 |
|---|---|---|---|---|---|---|---|---|---|
| Lender A | 1 | 1 | 100,000 | 50,000 | 80% | 90,000 | 70% | 1/1/09 | 3 |
| Lender B | 2 | 12 | 200,000 | 50,000 | 90% | 210,000 | 80% | 2/1/09 | 2 |
| Lender A | 3 | 1 | 100,000 | 40,000 | 60% | 70,000 | 50% | 2/1/09 | 2 |
| Lender A | 4 | 3 | 200,000 | 50,000 | 70% | 140,000 | 60% | 3/1/09 | 1 |
| Lender B | 5 | 2 | 100,000 | 60,000 | 40% | 90,000 | 30% | 3/1/09 | 1 |
| ... n | | | | | | | | | |
| Apr-09 | | | | | | | | | |

FIG. 2A

| Lender A | 1 | 2 | 100,000 | 50,000 | 80% | 90,000 | 70% | 1/1/09 | 4 |
|---|---|---|---|---|---|---|---|---|---|
| Lender B | 2 | 12 | 200,000 | 50,000 | 90% | 210,000 | 80% | 2/1/09 | 3 |
| Lender A | 3 | 1 | 100,000 | 40,000 | 60% | 70,000 | 50% | 2/1/09 | 3 |
| Lender A | 4 | 3 | 200,000 | 50,000 | 70% | 140,000 | 60% | 3/1/09 | 2 |
| Lender B | 5 | 2 | 100,000 | 60,000 | 40% | 90,000 | 30% | 3/1/09 | 2 |
| ... n | | | | | | | | | |
| May-09 | | | | | | | | | |

FIG. 2B

| Lender A | 1 | 2 | 100,000 | 50,000 | 80% | 90,000 | 70% | 1/1/09 | 5 |
|---|---|---|---|---|---|---|---|---|---|
| Lender B | 2 | 12 | 200,000 | 50,000 | 90% | 210,000 | 80% | 2/1/09 | 4 |
| Lender A | 3 | 2 | 100,000 | 40,000 | 60% | 70,000 | 50% | 2/1/09 | 4 |
| Lender A | 4 | 3 | 200,000 | 50,000 | 70% | 140,000 | 60% | 3/1/09 | 3 |
| Lender B | 5 | 2 | 100,000 | 60,000 | 40% | 90,000 | 30% | 3/1/09 | 3 |
| ... n | | | | | | | | | |
| Jun-09 | | | | | | | | | |

FIG. 2C

| Rule number | 142 |
|---|---|
| 1 | Lender A may not deliver code 1 loans |
| 2 | Original Loan Balance <= $417k for loan codes 1-20 |
| 3 | Original LTV <= 80% for loan codes 1-10 |
| 4 | Borrower income > $10k, < $10,000,000 for loan codes 1-20 |
| 5 | Loan code is numeric value with no alphabetical or special characters |

SYSTEMS AND METHODS FOR MEASURING DATA QUALITY OVER TIME

This application is a continuation of U.S. patent application Ser. No. 13/970,439 filed Aug. 19, 2013, which is a continuation of U.S. patent application Ser. No. 12/873,405, filed Sep. 1, 2010. The content of each of the above-referenced applications is expressly incorporated herein by reference to its entirety.

I. TECHNICAL FIELD

The present invention generally relates to the field of data quality analysis. More particularly, and without limitation, the invention relates to systems and methods for evaluating changes in the quality of data over time. Records are stored along with a business rule for evaluating common attributes of the records. The records are accessed at different time periods, and consistency data reflecting whether the common attribute is consistent with the business rule at different time periods is created. The consistency data is processed to generate a quality change rate that reflects changes in the consistency of the common attribute with the business rule over time.

II. BACKGROUND INFORMATION

"Data quality" is a term used to describe the completeness, correctness, or integrity of data, such as records stored in a database system. Data quality can be measured by reading the records from a database system and comparing attributes of the records to various rules that define acceptable values for the attributes. For example, rules can define value ranges for a given attribute, a data format for a given attribute, or require that an attribute not have missing data. By reading records from a database and evaluating the record attributes based on such rules, data quality can be quantified on an attribute-by-attribute basis. In addition, data quality can be quantified on an aggregate basis for a database table by evaluating the column attributes of the table. Aggregate measures of quality can also be developed for entire database systems.

However, existing techniques for measuring data quality do not provide a clear picture of how data quality changes over time. Instead, existing techniques merely provide a "snapshot" or instantaneous view of the quality of a given database at a given time. For example, in one month a database might be evaluated and have 97% of records without any missing values, and in the next month the same database may have 98% of records without any missing values. However, existing techniques do not provide information about whether these changes in the percentage of missing values reflect a trend towards improving quality of the database. Rather, existing techniques merely provide instantaneous quality measurements without providing information about changes or trends in data quality.

Thus, it is desirable to provide data quality information that reflects how data quality changes over time. It is further desirable to provide automated analyses of the data quality information that enables users to understand the causes and impacts of the measured changes in data quality.

SUMMARY

Consistent with exemplary embodiments of the invention, computer-implemented methods, systems, and computer-readable media are provided.

A first computer-implemented method may include storing, by a computing platform, a plurality of records, the records sharing a common attribute; reading, by the computing platform, first values for the common attribute corresponding to a first time period; reading, by the computing platform, second values for the common attribute corresponding to a second time period; accessing, by the computing platform, a business rule for evaluating the common attribute; generating, by the computing platform, first consistency data for the common attribute, the first consistency data reflecting the extent to which the first values of the common attribute are consistent with the business rule at the first time; generating, by the computing platform, second consistency data for the common attribute, the second consistency data reflecting the extent to which the second values of the common attribute are consistent with the business rule at the second time; and processing, by the computing platform, the first consistency data and the second consistency data to generate a quality change rate of the common attribute from the first time period to the second time period, based on the difference between the first consistency data and the second consistency data.

A system may include a processor; and a computer-readable medium comprising instructions executable by the processor to: read first values for a common attribute of a plurality of records, the first values corresponding to a first time period; read second values for the common attribute corresponding to a second time period; access a business rule for evaluating the common attribute; generate first consistency data for the common attribute, the first consistency data reflecting the extent to which the first values of the common attribute are consistent with the business rule at the first time; generate second consistency data for the common attribute, the second consistency data reflecting the extent to which the second values of the common attribute are consistent with the business rule at the second time; and process the first consistency data and the second consistency data to generate a quality change rate of the common attribute from the first time period to the second time period, based on the difference between the first consistency data and the second consistency data.

A computer-readable medium may include processor-readable instructions, which when executed by a processor perform a method comprising: reading first values for a common attribute of a plurality of records, the first values corresponding to a first time period; reading second values for the common attribute corresponding to a second time period; accessing a business rule for evaluating the common attribute; generating first consistency data for the common attribute, the first consistency data reflecting the extent to which the first values of the common attribute are consistent with the business rule at the first time; generating second consistency data for the common attribute, the second consistency data reflecting the extent to which the second values of the common attribute are consistent with the business rule at the second time; and processing the first consistency data and the second consistency data to generate a quality change rate of the common attribute from the first time period to the second time period, based on the difference between the first consistency data and the second consistency data.

A second computer-implemented method may include storing, by a computing platform, a plurality of records, each of the records having a common attribute; reading, by the computing platform, first values for the common attribute corresponding to a first time period; reading, by the computing platform, second values for the common attribute corresponding to a second time period; determining, by the computing platform, an aggregate number of changes of the common attribute from the first time period to the second time period, the aggregate number of changes being based on differences between the first values and the second values; and processing, by the computing platform, the aggregate number of changes to the common attribute to generate a volatility measure for the common attribute from the first time period to the second time period, the volatility measure reflecting the frequency of changes to the common attribute A third computer-implemented method may include storing, by a computing platform, a plurality of records, each of the records having a common attribute; reading, by the computing platform, values of the common attribute; determining, by the computing platform, a quality measure of the common attribute by evaluating the values of the common attribute with a business rule; determining, by the computing platform, a number of outcomes associated with the records; and determining a relationship between the number of outcomes associated with the records and the quality measure of the common attribute.

A fourth computer-implemented method may include storing, by a computing platform, a plurality of records, each of the records having a common attribute; reading, by the computing platform, values of the common attribute corresponding to a first time period; reading, by the computing platform, values of the common attribute corresponding to a second time period subsequent to the first time period; determining, by the computing platform, a volatility measure of the common attribute by determining a number of changes to the common attribute from the first time period to the second time period; determining, by the computing platform, a number of outcomes associated with the records; and determining a relationship between the number of outcomes and the volatility measure.

It is to be understood that both the foregoing general description and the following detailed description are exemplary and explanatory only and are not restrictive of the invention or embodiments thereof, as claimed.

BRIEF DESCRIPTION OF THE DRAWINGS

The accompanying drawings, which are incorporated in and constitute a part of this disclosure, illustrate various embodiments and aspects of the present invention. In the drawings:

FIGS. 2A-2C illustrate an exemplary data structure, consistent with certain embodiments of the invention;

FIG. 3 illustrates an exemplary data structure, consistent with certain embodiments of the invention;

FIG. 4 illustrates an exemplary user interface, consistent with certain embodiments of the invention;

DETAILED DESCRIPTION

Reference will now be made in detail to the exemplary embodiments of the invention, examples of which are illustrated in the accompanying drawings. Wherever possible, the same reference numbers will be used throughout the drawings to refer to the same or like parts.

Figure 1:
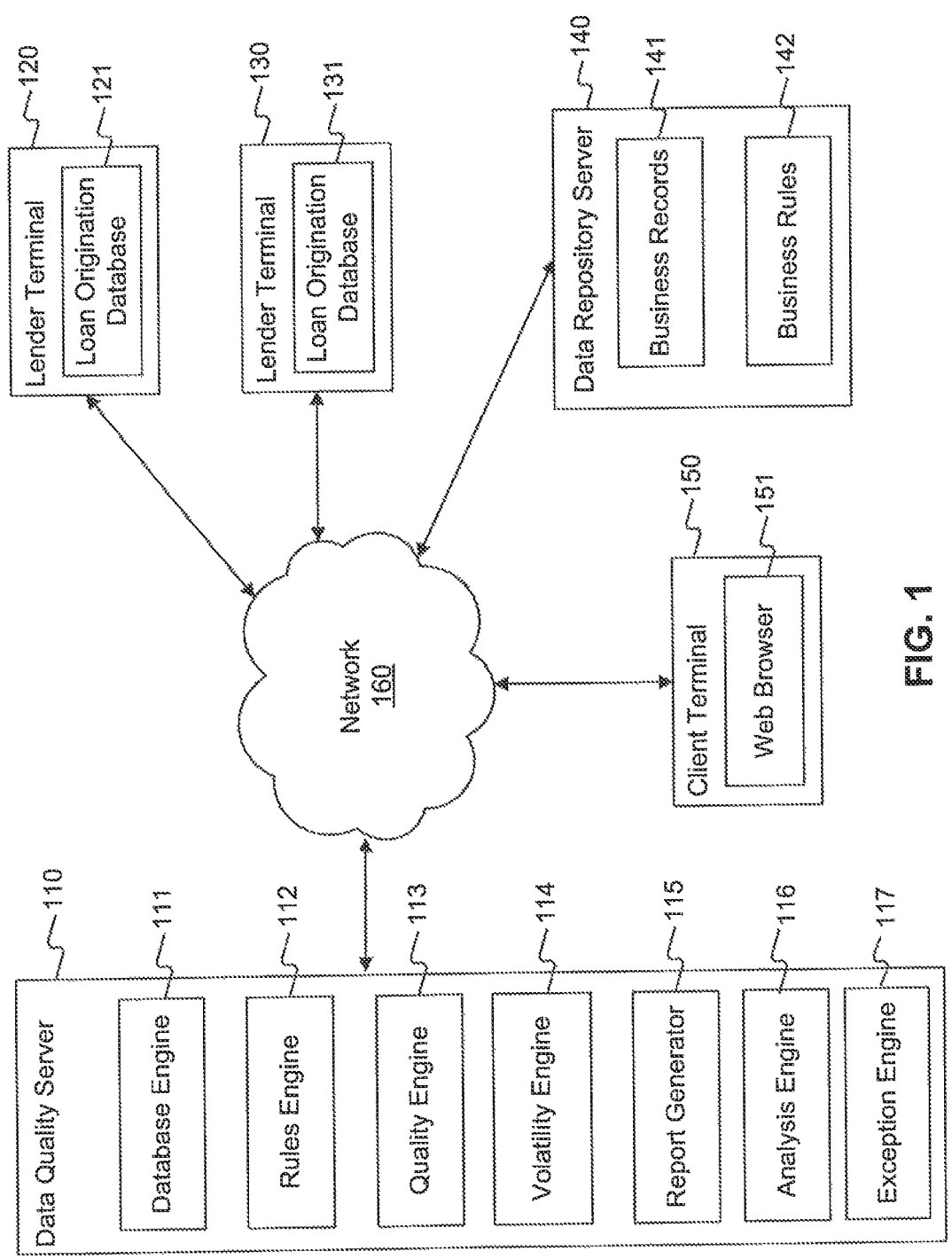
FIG. 1 is a block diagram of an exemplary system, consistent with certain embodiments of the invention.

FIG. 1 illustrates a block diagram of an exemplary system environment that comprises a system 100, consistent with an embodiment of the invention. System 100 may include a data quality server 110. Data quality server 110 may be operated by a financial entity such as a Government Sponsored Enterprise ("GSE"). Server 110 may communicate with various other devices using network 160, such as lender terminals 120 and 130, data repository 140, and client terminal 150. Lender terminal 120 may be operated by a Lender A who originates loans and sells them to the GSE that operates server 110. Likewise, lender terminal 130 may be operated by a Lender B, who also originates loans and then sells them to the GSE. Lenders A and B may store data corresponding to the originated loans in loan origination databases 121 and 131, respectively.

Data repository server 140 may also be operated by the GSE, and may include data such as business records 141 and business rules 142. Business records 141 may include data used by the GSE for business processes, such as records of the loans originated by Lender A and Lender B. In some embodiments, Lenders A and B may send loan origination data to the GSE, who then stores the data in their own database, e.g., business records 141. Business records 141 may also include other data used by the GSE, such as data identifying the various lenders with whom the GSE does business, personnel records, financial records, or any other data that is used in GSE's business processes. Business rules 142 may be used to evaluate the data in business records 141. For example, business rules 142 may specify acceptable value ranges for certain attributes of business records 141, or may specify that certain attributes of business records 141 should not change after a certain date, etc.

Client terminal 150 may be operated internally by the GSE, or may also be operated by external parties with which the GSE shares database quality information. Client terminal 150 may include a web browser 151 for viewing various reports provided by data quality server 110.

Data quality server 110 may include a database engine 111 for accessing and querying business records 141, and a rules engine 112 for accessing business rules 142 and applying business rules 142 to business records 141. Data quality server 110 may also include a quality engine 113 for generating various quality metrics reflecting the quality of business records 141, for example by determining whether business records 141 are consistent with business rules 142. Data quality server 110 may also include a volatility engine 114 for evaluating the volatility of business records 141, e.g., the number of changes to business records 141 in a given period of time.

Data quality server 110 may include a report generator 115 for generating various reports and sending the reports to client terminal 150. Data quality server 110 may also include an analysis engine 116 for analyzing quality and volatility data generated by quality engine 113 and volatility engine 114, and for providing results of the analysis to client terminal 150. Data quality server 110 may also include an exception engine 117 for determining whether data quality or data volatility for business records 141 exceeds certain thresholds, and providing data to a user at client terminal 150 indicating that the thresholds have been exceeded.

Although FIG. 1 shows a particular number and arrangement of components, other arrangements and numbers of components could be used to implement embodiments of the invention. For example, there may be various numbers of data quality servers 110, lender terminals 120 and 130, data repository servers 140, and client terminals 150. Furthermore, each of the illustrated devices may be combined into a single device. For example, the functions of data quality server 110, data repository server 140, and client terminal 150 described herein may be implemented on a single server operated by the GSE. Data quality server 110, lender terminals 120 and 130, data repository server 140, and client terminal 150 may be general-purpose computers including one or more processors, memory, and storage devices. Network 160 may be a wired or wireless network or any combination thereof, such as a home or office LAN in communication with the Internet. Methods described herein may be embodied as processor-readable instructions on computer-readable media, such as a memory in data quality server 110.

FIGS. 2A, 2B, and 2C illustrate exemplary business records 141. For example, business records 141 may include tables identifying various attributes of loans originated by Lenders A and B, and sold to the GSE. For example, the loan attributes may include data source 201, e.g., the lender who provided the loan data to the GSE. The loan attributes may also include a loan number 202, or a unique identifier for the loan. Loan attributes may also include a loan code 203, which may indicate certain types of loans, for example, first-time homebuyer, cash-out refinance, and conforming 30 year mortgage. Other attributes may include the original loan balance 204, the borrower's income 205 (i.e., the borrower's income as reported at the time the loan was originally funded), the original loan-to-value ("LTV") percentage 206, the current loan balance 207, the current loan-to-value 208, the month the loan was originally funded (month funded) 209, and the number of months after funding 210.

FIG. 2A illustrates the state of business records 141 at a first time, for example, April 2009. FIG. 2B illustrates the state of business records 141 at a second time, for example, May 2009, and FIG. 2C illustrates the state of business records 141 at a third time, for example, June 2009. Note that some loan attributes may be expected to change over time (e.g., current balance 207), whereas other attributes may be expected remain unchanged (e.g., original loan balance 204). The month a loan was originally funded may be defined as "month 0." Thus, for loan 1, January 2009 is month 0, February 2009 is month 1, etc. Likewise, for loan 5, March 2009 is month 0, April 2009 is month 1, etc.

Business records 141 may be processed in the months after the initial funding, and reference will be made to the timing of such processing as month "1," i.e., one month after funding, month "2," two months after funding, and so on. Thus, for loan 1, funded in January 2009, month 3 is April 2009, as shown in months after funding column 210 of FIG. 2A. Likewise, as shown in FIG. 2B, month 4 is May 2009, and as shown in FIG. 2C, month 5 is June 2009.

FIG. 3 illustrates exemplary business rules 142. As shown in FIG. 3, business rules 142 can be uniquely identified by a rule number. Business rule 1 states that Lender A should not deliver loans with a loan code of 1. Business rules 2-5 will be discussed in more detail below, but generally reflect expected behaviors of business records 141, for example as defined by a user at client terminal 150.

Figure 4:
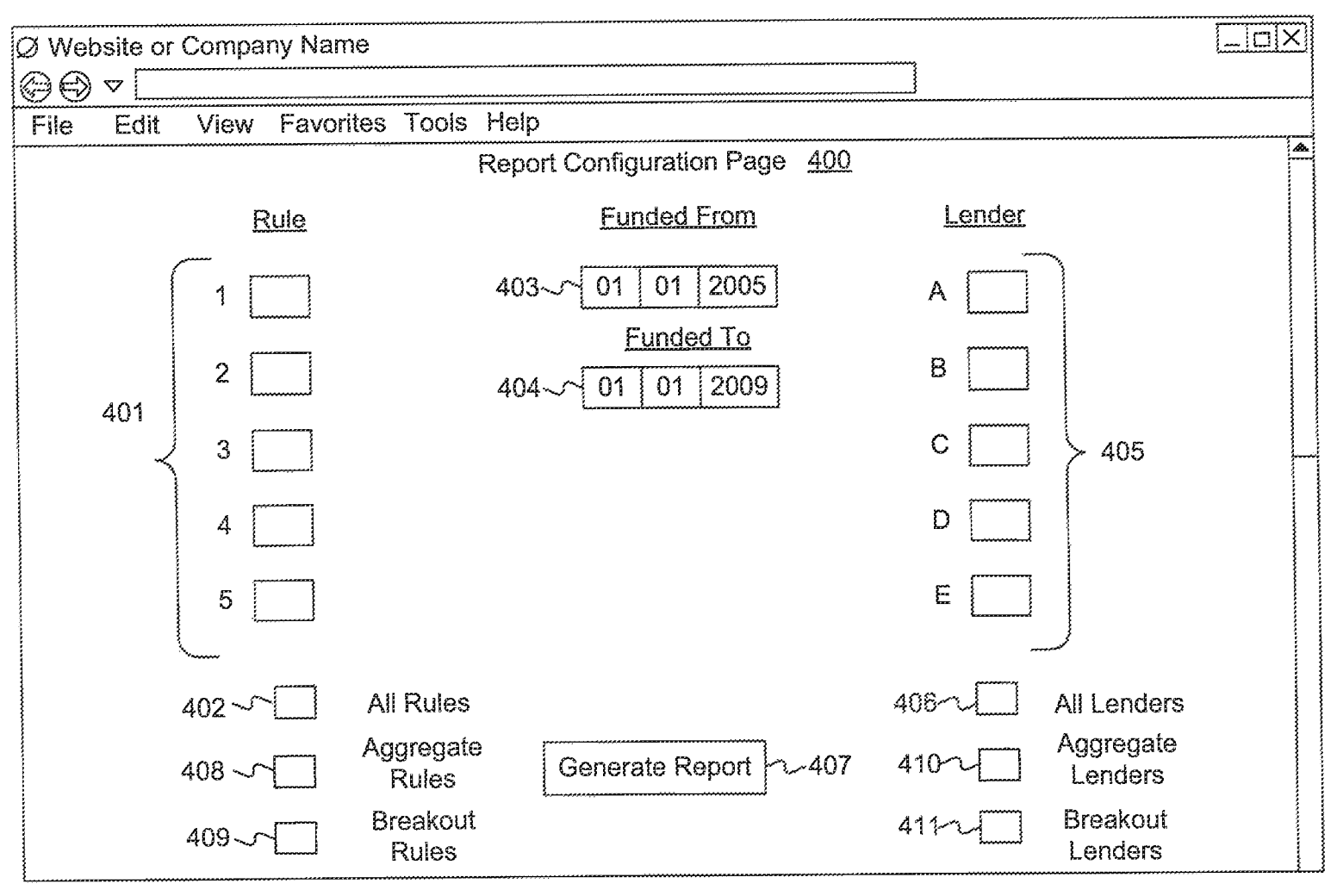

FIG. 4 illustrates an exemplary report configuration page 400. Data quality server 110 may transmit report configuration page 400 to client terminal 150, and the user may select from various interface options in report configuration page 400, and then click generate report icon 407. When the user clicks generate report icon 407, client terminal 150 sends a request identifying the requested report configuration to data quality server 110.

Report configuration page may include options for configuring the requested report by selecting various rules and attribute values. For example, the user can select one or more individual business rules 142 from rule boxes 401, or can select all rules box 402 to indicate that they would like data quality server 110 to apply all business rules 142. The user can also select various attribute values to limit the data in business records 141 to which the selected rules are applied. For example, the user can use funded from box 403 and funded to box 404 to define a range of dates, and data quality server 110 will apply the selected rules only to loans that were originally funded within the defined range. Likewise, the user can select one or more of lender boxes 405, and data quality server 110 will apply the selected rules to only those loans originally funded by the identified lenders. Alternatively, the user can select all lenders box 406 to apply the selected rules to loans originally funded by all of the lenders. As discussed in more detail below, once the user submits the report request by selecting generate report icon 407, data quality server 110 may generate an error report. Report configuration page 400 also includes aggregate rules box 408, breakout rules box 409, aggregate lenders box 410, and breakout lenders box 411, which will be discussed in more detail below.

Figure 5:
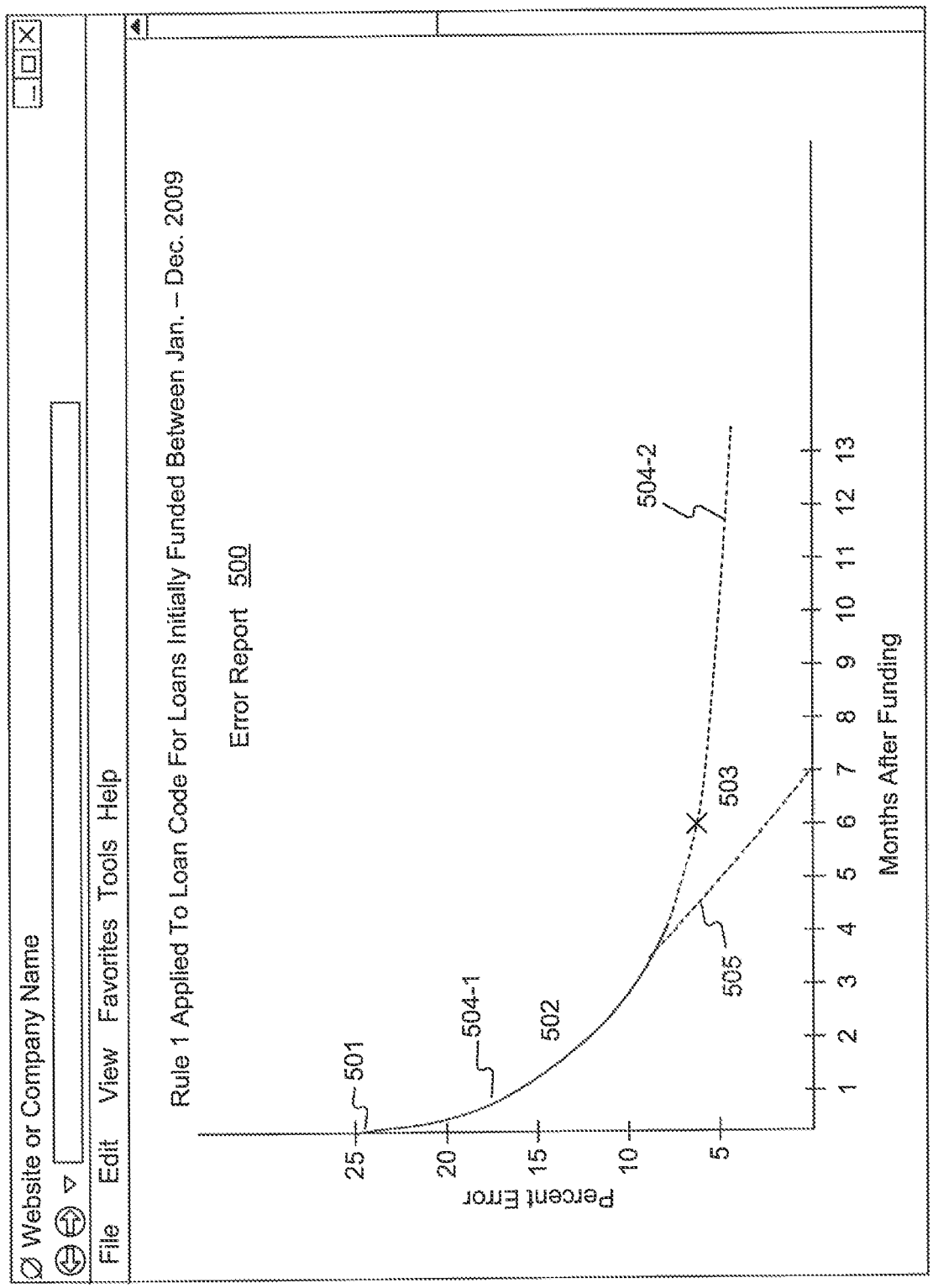
FIG. 5 illustrates an exemplary report, consistent with certain embodiments of the invention.

FIG. 5 illustrates an exemplary error report 500 that may be generated by data quality server 110. Generally speaking, error report 500 may comprise a graph of loan error percentage for each of the loans in business records 141, and illustrates how the loan error percentage changes after the loans were initially funded. If the user selects aggregate rules box 408, the graph will reflect the aggregate loan error percentage for all of the selected rules, i.e., the percentage of loans that had a data error for any one of the selected loans. Alternatively, the user may select breakout by rule box 409, and the graph will include separate error percentages for each identified rule.

For example, if the user selects rules 1 and 2 and aggregate rules box 408, data quality server 110 will calculate the percentage of identified loans that are inconsistent with either rule 1, rule 2, or both, and error report 500 will graph these errors as a single line. However, if the user selects rules 1 and 2 and breakout by rule box 409, data quality server 110 will calculate separate error percentages for the identified loans, and graph the error percentages for rules 1 and 2 as separate lines.

Likewise, report configuration page 400 may include an aggregate lender box 410, and a breakout lenders box 411. If the user selects aggregate lenders box 410, error report 500 will reflect the aggregate error percentage for all of the identified lenders. Likewise, if the user selects breakout lenders box 411, data quality server 110 will calculate and graph separate error percentages for the individual identified lenders. Other parts of report configuration page 400 will be explained below.

Figure 6:
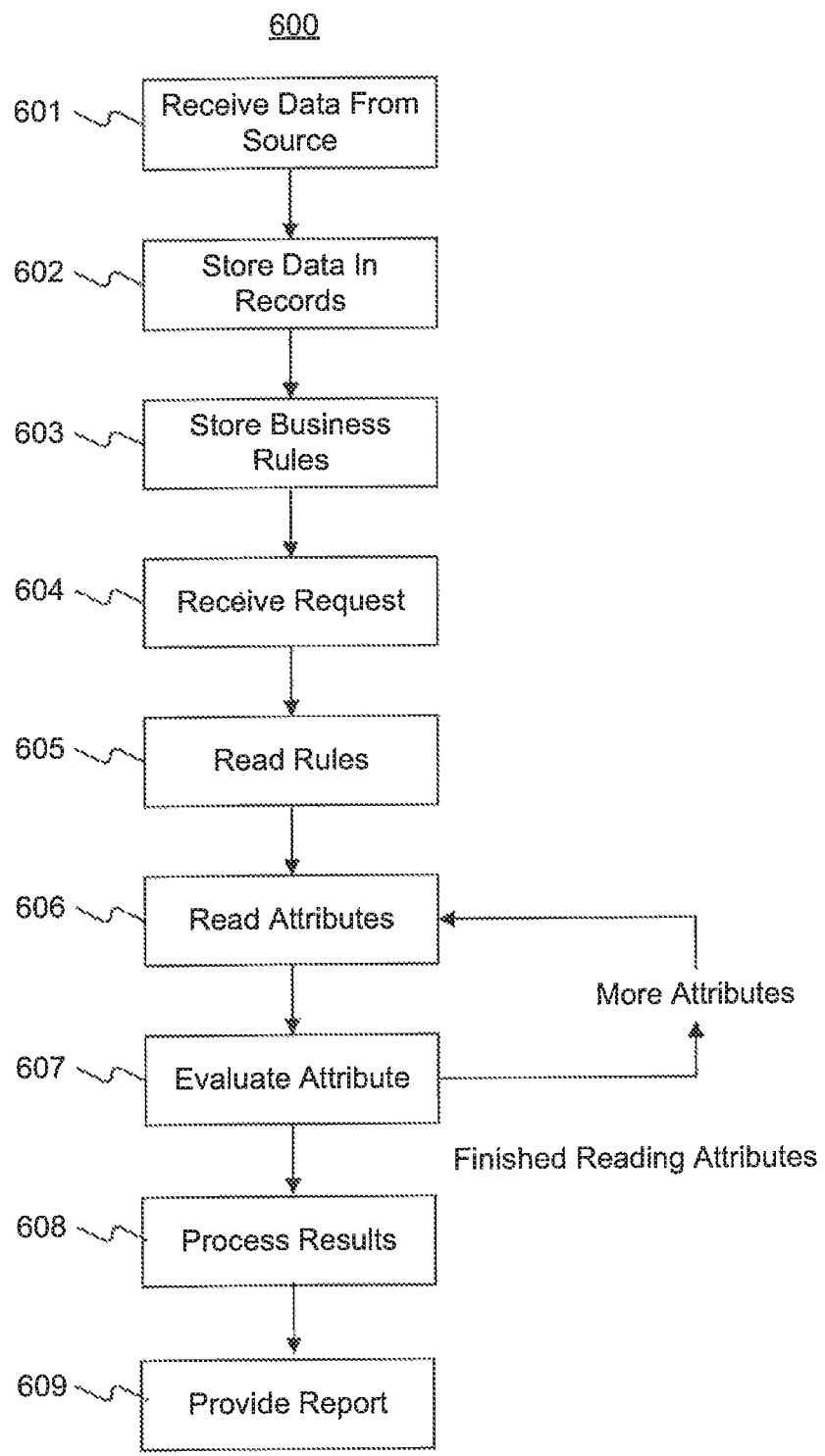
FIG. 6 illustrates a flowchart of an exemplary method, consistent with certain embodiments of the invention.

FIG. 6 is an exemplary flowchart of a method 600, consistent with an embodiment of the invention. FIG. 6 illustrates an exemplary method for evaluating data quality. In some embodiments, method 600 may be performed by data quality server 110 and data repository server 140.

As shown in FIG. 6, method starts 600 with step 601 by receiving data from a source. For example, data repository server 140 may receive loan data from Lender A and Lender B, e.g., data from loan origination databases 121 and 131, respectively. The loan data received from Lender A and Lender B may be in any data format, such as SQL database tables, spreadsheet tables, data objects such as C++ or Java objects, or flat files such as text or comma-separated value ("CSV") files.

Next, at step 602, data repository server 140 may store the loan data as business records 141. In some embodiments, business records 141 will be in a different data format than the loan data received from Lender A and Lender B. In such embodiments, data repository server 140 may format the loan data in the format used by data repository server 140, such as the tabular form shown in FIGS. 2A-2C.

Next, at step 603, data repository server 140 may store business rules 142. For example, data repository server 140 may receive business rules 142 from client terminal 150. A user at client terminal 150 may define various business rules for the different loan attributes of business records 141. For example, the user may define business rule 1 as shown in FIG. 3, i.e., Lender A is not allowed to deliver loans with a loan code of 1. The user at client terminal 150 may continue defining rules, and in turn, data repository server 140 will continue to populate business rules 142 with the rules received from client terminal 150.

Next, at step 604, data quality server may receive a request to evaluate the data quality of business records 141 from client terminal 150. For example, the user may configure a report request using report configuration page 400. For the purposes of this example, the user selects rule 1 from rule boxes 401, enters "01/01/2005" in funded from box 403 and "12/01/2009" in funded to box 404, and selects all lenders box 406. This configures report configuration page 400 to request that data quality server 110 provide a data quality report that evaluates all of the loans in business records 141 that were originally funded between 1/1/2005 and 12/1/2009, for all lenders, for compliance with business rule 1. For the purposes of this example, the user also selects aggregate rules box 408 and aggregate lenders box 410. The user then clicks generate report icon 407, and a request for the report is transmitted to data quality server 110.

Next, at step 605, data quality server 110 may read one or more of business rules 142 from data repository server 140, i.e, the loans identified by the request. For example, rules engine 112 on data quality server 110 may read rule 1 from business rules 142. As shown in FIG. 3, rule 1 specifies that Lender A should not deliver loans with a loan code of "1." In some embodiments, rules engine 112 may continue reading more business rules from data repository server 140. However, for the purposes of this example, rules engine 112 will only read rule 1 from business rules 142 at this time, because the user identified only rule 1 in report configuration page 400.

Next, at step 606, data quality server 110 may read attributes from business records 141 from data repository server 140, i.e., the loans identified by the request. In some embodiments, data quality server 110 may only read those attributes identified by the rules read in step 605, e.g., loan code 203 for rule 1. To read the attributes, database engine 111 on data quality server 110 may execute SQL queries on business records 141 to read attributes such as loan code 203. In our example, the first time database engine 111 reads the loan attribute values from business records 141 for April 2009. Thus, as shown in FIG. 2A, data quality server 110 reads the values 1, 12, 1, 3, and 2 for loan numbers 1-5, respectively, and continues reading values for loans 6-n (not shown). At this time, data quality server 110 may also read the attribute data source 201 from business records 141 for loan numbers 1-n, to obtain loan code 203 values "Lender A, Lender B, Lender A, Lender A, Lender B," for loan numbers 1-5, respectively, and continues reading values for loans 6-n.

Next, at step 607, data quality server 110 may evaluate the attributes read from business records 141 using business rules 142. For example, quality engine 113 on data quality server 110 may determine whether each row in business records 141 is consistent with the business rules 142 read at step 605. As discussed, in an example, business rule 1 states that Lender A should not deliver loans with a code of "1." Thus, quality engine 113 may determine that loan numbers 1 and 3 are not consistent with business rule 1, because both of these loans have "Lender A" as the value of data source 201, and a value of "1" for loan code 203. Quality engine 113 may store "consistency data" reflecting that loan numbers 1 and 3 are not consistent with business rule 1, while loans 2, 4, and 5 are consistent with business rule 1. In some embodiments, the consistency data may be in the form of a Boolean flag indicating a "1" for a "pass" result and a 0 for a "fail" result. However, other suitable implementations may be used for the consistency data stored by quality engine 113 at step 606. At this step, data quality server 110 may also continue to evaluate loans 6-n for consistency with business rule 1.

As shown in FIG. 6, method 600 may next move back to step 606, or continue to step 608, depending on whether there is more data to evaluate. For the purposes of this example, method 600 moves back to step 606, and continues reading attributes from business records 141. In this example, database engine 111 on data quality server 110 reads the business records 141 for May 2009, shown in FIG. 2B. As shown in FIG. 2B, database engine 111 reads the values "2, 12, 1, 3, 2 . . . " for loan code 203, and the values "Lender A, Lender B, Lender A, Lender A, Lender B" for data source 201, for loan numbers 1-n, respectively.

Next, method 600 moves to step 607, and evaluates the attributes read at step 606. As discussed in the above example, business rule 1 states that Lender A should not deliver loans with a code of "1." For month 2, loan 3 is inconsistent with business rule 1. Thus, for month 2, quality engine 113 may store consistency data reflecting that loans 1, 2, 4, and 5 are consistent with business rule 1, and that loan 3 is not consistent with business rule 1. Likewise, quality engine 113 may continue to process business records 141 by evaluating and storing consistency data for loans 6-n.

Again, for the purposes of this example, method 600 moves back to step 606, and more data is read from business records 141. In this example, database engine 111 on data quality server 110 reads the business records 141 for June 2009, shown in FIG. 2C. As shown in FIG. 2C database engine 111 reads the values "2, 12, 2, 3, 2 . . . " for loan code 203, and the values "Lender A, Lender B, Lender A, Lender A, Lender B . . . " for data source 201, for loan numbers 1-n, respectively.

Next, method 600 again moves to step 607, and evaluates the attributes read for the month 2 business records 141 using business rules 142. As discussed in the above example, business rule 1 states that Lender A should not deliver loans with a code of "1." However, for month 3, loans 1-5 do not include any records where Lender A has delivered a loan code of "1." Thus, for month 3, loans 1-5 are consistent with business rule 1. Quality engine 113 may store consistency data reflecting that loans 1-5 are consistent with business rule 1, and likewise continue similar processing for loans 6-n.

Now, for the purposes of this example, data quality server 110 is finished reading data from business records 141, and method 600 moves to step 608. At step 607, data quality server 110 may process the consistency data to generate quality data reflecting the extent to which business records 141 are consistent with rule 1. For example, the quality data may be a percentage of "fail" results on a months-after-funding basis. Thus, assuming "n" is 100, and 25 loans are inconsistent with rule 1 when initially delivered, the quality data for month 0 would reflect a failure rate of 25%. Further, five of the loans were corrected one month after initially being funded (month 1), the quality data for month 1 would reflect a failure rate of 20%. Alternatively, pass rates instead of fail rates can be used.

At step 609, the quality data may be presented to a user at client terminal 140 in the form of one or more reports created by report generator 115 on data quality server 110. For example, data quality server 110 may transmit error report 500 to client terminal 150. Error report 500 is a graph with the y-axis representing the error rate of the loan code attribute of business records 141, while the x-axis represents the number of months after funding. Error curve 504 (illustrated as a solid portion 504-1 and a dashed portion 504-2) shows the changes in the quality of business records 141 when evaluated using rule 1 over a period of time.

Thus, as shown in FIG. 5, approximately 25% of loan codes were inconsistent with rule 1 at month 0, when the loan data was originally delivered from lenders A and B and stored in business records 141 (ref. 501). By the second month after funding, approximately 10% of the loan codes were inconsistent with rule 1 (ref. 502), indicating that approximately 15% of the loan code attributes in business records 141 were corrected during the first two months after funding. By six months after funding, the error rate declined to approximately 6% (ref. 503).

Each discrete point on loan code error report 500 falls along error curve 504-1/504-2. Error curve 504-1 (solid portion) may reflect the actual percent error of the business records evaluated by data quality server 110, while error curve 504-2 (dashed portion) may reflect predicted error rates derived using mathematical techniques. Error curve 504 flattens considerably at about point 503, indicating that the error rate of business records 141 is expected to change very little after six months from the initial delivery of the loan data. Depending upon business expectations, this may be normal behavior for the loan codes. For example, lenders A and B may typically deliver loan origination data with an initial set of loan codes, and then internally process the loan codes to ensure correctness. Any errors identified by lenders A and B may typically be fixed by the lenders within the first six months after funding of the loans, for example by providing updated loan origination data.

Note that FIG. 5 provides the user with information not only about the quality of business records 141 at any particular time, but with a view of the changes in the quality of business records 141 over time. At any given point on loan code error report 500, a tangent can be drawn to error curve 504 that shows the rate of change of the quality of business records 141, i.e., the first derivative of error curve 504. For example, tangent 505 shows a point on error curve 504 where the slope of the tangent line is approximately −1, at month four. As shown in FIG. 5, tangent 505 can be extended to the x-intercept (dashed line) to approximately seven months after funding, indicating that if the loan quality continued to improve at the same rate as in month four, all the loan data in business records 141 may be consistent with rule 1. In some embodiments, the user may also be provided with discrete values for the rate of change of the data quality (e.g., the tangent), at any given point in time (e.g., 1% per month).

However, as can further be seen from FIG. 5, the loan quality does not necessarily continue decreasing at the rate defined by tangent 505. Rather, error curve 504 exhibits behavior similar to an exponential decay. By taking the second derivative of error curve 504, i.e., the convexity of error curve 504, we can perform more refined calculations to predict the changes in the quality rate defined by error curve 504. As an example, regression techniques can be used to fit a curve to the data and approximate an error function. In some embodiments, an error percentage ½ life can be estimated at any point along error curve 504. The ½ life value is an expected amount of time before the percentage error will decrease to ½ of its current value. For example, as can be seen from FIG. 5, the error percentage at 3 months after funding is approximately 10%, and the error percentage at 13 months after funding is approximately 5%. Thus, at 3 months after funding, the estimated ½ life is approximately 10 months, i.e., it will take 10 months for the error percentage of 10% at month 3 to decline to the 5% error percentage in month 13. If duration is defined as the slope of tangent line 505, multiplied by negative one, then the error percent could be predicted to change around month t=4 according to the following formula:

$$\text{Percent Error Change} \approx -\text{duration} \times \Delta t$$

Note that in the above approximation, duration captures the fact that the percent error curve is downward sloping, but does not capture its upward curvature. To describe this behavior, a best-fit parabola could be used in the form of a second-order, Taylor polynomial approximation around month t=4, as follows:

$$\text{Percent Error Change} \approx \frac{\text{convexity}}{2} \times (\Delta t)^2 - \text{duration} \times \Delta t$$

In still further embodiments, time series analysis, logistic or probit regression, or other mathematical techniques may be applied to predict future data quality, e.g., dashed portion of error curve 504-2.

Additional Examples of Rules

As discussed above, other business rules 142 can be defined for evaluating business records 141. For example, as shown in FIG. 3, business rule 2 states that original loan balance 204 should be less than or equal to $417k for loans with a code between 1 and 20. Codes 1 through 20 may correspond to non-"jumbo" loans, and $417k may be the maximum allowable loan balance for a non-"jumbo" loan. Thus, any loan with a code from 1 through 20 should not have a higher initial loan balance than $417k.

As also shown in FIG. 3, business rule 3 states that original LTV 206 should be less than or equal to 80% for loan codes 1-10. Loan codes 1-10 may correspond to "conforming" loans, which are not available for loan-to-value ratios higher than 80%. Thus, any loan with a code from 1 through 10 should not have an original LTV higher than 80%.

As also shown in FIG. 3, business rule 4 states that borrower income 205 should not be less than $10k per year, or greater than $10 million per year, for loan codes 1-20. Business rule 4 may be considered a "reasonableness check" on the data in business records 141. For borrowers with incomes under $10k per year, it is unlikely that they will qualify for a home loan, and thus any business record indicating as much is likely to have incorrect data in borrower income attribute 205. For borrowers with incomes over $10 million per year, it is unlikely that these borrowers would borrow money to purchase a house that costs less than $417k (as loan codes 1-20 are non-jumbo loans), so any business record indicating as much is also likely to have incorrect data.

As further shown in FIG. 3, rule 5 requires that loan codes are numeric values only, without alphabetical or special characters. For example, certain lenders may use proprietary loan codes for internal purposes, e.g., loan codes such as "CNJ" for "conforming non-jumbo." Lenders may be responsible for converting their proprietary loan codes to the loan codes used by the GSE before providing the loan origination data. Thus, any loan code in business records 141 with an alphabetic ("A-Z" and "a-z") or special ("!", "%", "$", etc.) character does not represent a valid loan code for the GSE.

Rules can also be defined to require "completeness" of certain attributes. For example, some attributes may be allowed to have a "null" value, for example a null borrower income. In some embodiments, only loans with particular loan codes are allowed to have a null value, and rules can be defined restricting null values to these loan codes.

In still further embodiments, loans can reference an authoritative third party data source, and require that the loan attributes are consistent with the third party source. As an example, tax documents from the IRS can be used as an authoritative source of information for a borrower's income. A rule may be defined requiring that the borrower's income 205 in business records 141 is within +/−10% of the income reported on their tax return for the year the loan was originally funded. As another example, the authoritative data source may be original loan documents provided by the lenders.

In still further embodiments, rules can be defined to evaluate data for redundancy and consistency. For example, a rule to evaluate redundancy could be defined specifying a particular attribute, such as original loan balance, should not appear in more than one table in business records 141. Alternatively, original loan balance may be permitted to appear in multiple tables, but a rule to evaluate consistency could be defined to require that the two tables have identical original loan balances.

Furthermore, rules can be defined for "derived" attributes. Derived attributes may be attributes that are not directly delivered by the lenders, but instead are functions of attributes originally delivered by the lenders. For example, a borrower's income-to-original loan balance ratio (not shown) can be defined as borrower income 205 divided by original loan balance 204. Thus, the income-to-original loan balance ratio is a "derived" attribute taken from attributes 204 and 205. Because borrower income 205 is reported by the borrower in order to obtain the loan, it may be expected that the borrower's income is in some way proportional to the original loan balance 204. Thus, the user at client terminal 150 may define a rule that the borrower's income should be, for example, no less than 10% of the original loan balance. By evaluating business records 141 with such a rule, it may be possible to identify lenders that are funding loans to borrowers with insufficient income to pay their loan obligations each month.

Reporting

As discussed above, data quality server 110 may generate error report 500, and transmit error report 500 to client terminal 150. In some embodiments, error report 500 is a web page, which the user at client terminal 150 may view in web browser 151. As further discussed above, users at client terminal 150 may also be provided with an interface such as report configuration page 400 that allows them to select various rules and attributes to generate customized reports for the data in business records 141.

For example, data quality server 110 may provide a report configuration page 400 to a user by transmitting report configuration page 400 to client terminal 150. By selecting from various options available on report configuration page 400, the user can request a customized data quality report from data quality server 110. Note that the examples shown in FIG. 4 are exemplary. Any attribute of business records 141 may be used to limit the number of loans that are applied by data quality server 110. For example, report configuration page 400 may also contain elements allowing the user to select loans with particular values for loan numbers, loan codes, original balances, borrower incomes, original and current LTV, or current balance (not shown).

As another example of reporting by data quality server 110, the user at client terminal 150 may select rule 3 from rule boxes 401, enter "01/01/2005" in start date 603 and "01/01/2009" in end date 404, and select "Lender A" and "Lender C" from lender boxes 406. The user may then click "Generate Report" icon 407, and client terminal 150 may transmit a request to data quality server 110 to provide a data quality report. The data transmitted to data quality server 110 may identify the rule or rules requested by the user, as well as the values for month funded and lender that the user selected in report configuration page 400.

Upon receiving the request, data quality server 110 may execute method 600 on the data identified in the request using the identified rule. For example, starting at step 606, data quality server 110 may read the loan attributes for all of loans in business records 141 that meet the criteria specified in report configuration page 600, i.e., all the loans that were funded between Jan. 1, 2006 and Jan. 1, 2009, and originated by Lender A or Lender C. Next, at step 607, data quality server 110 may evaluate the loan attributes by applying rule 3 to the attributes of these loans. Referring to FIG. 3, rule 3 requires that the original LTV for loan codes 1-10 is less than 80%. Thus, data quality server would determine which of the above-identified loans have loan codes between 1 and 10. Any such loan with a LTV of greater than 80% would result in a "fail" at step 607, and loans with an LTV of 80% or less would result in a "pass."

Figure 7:
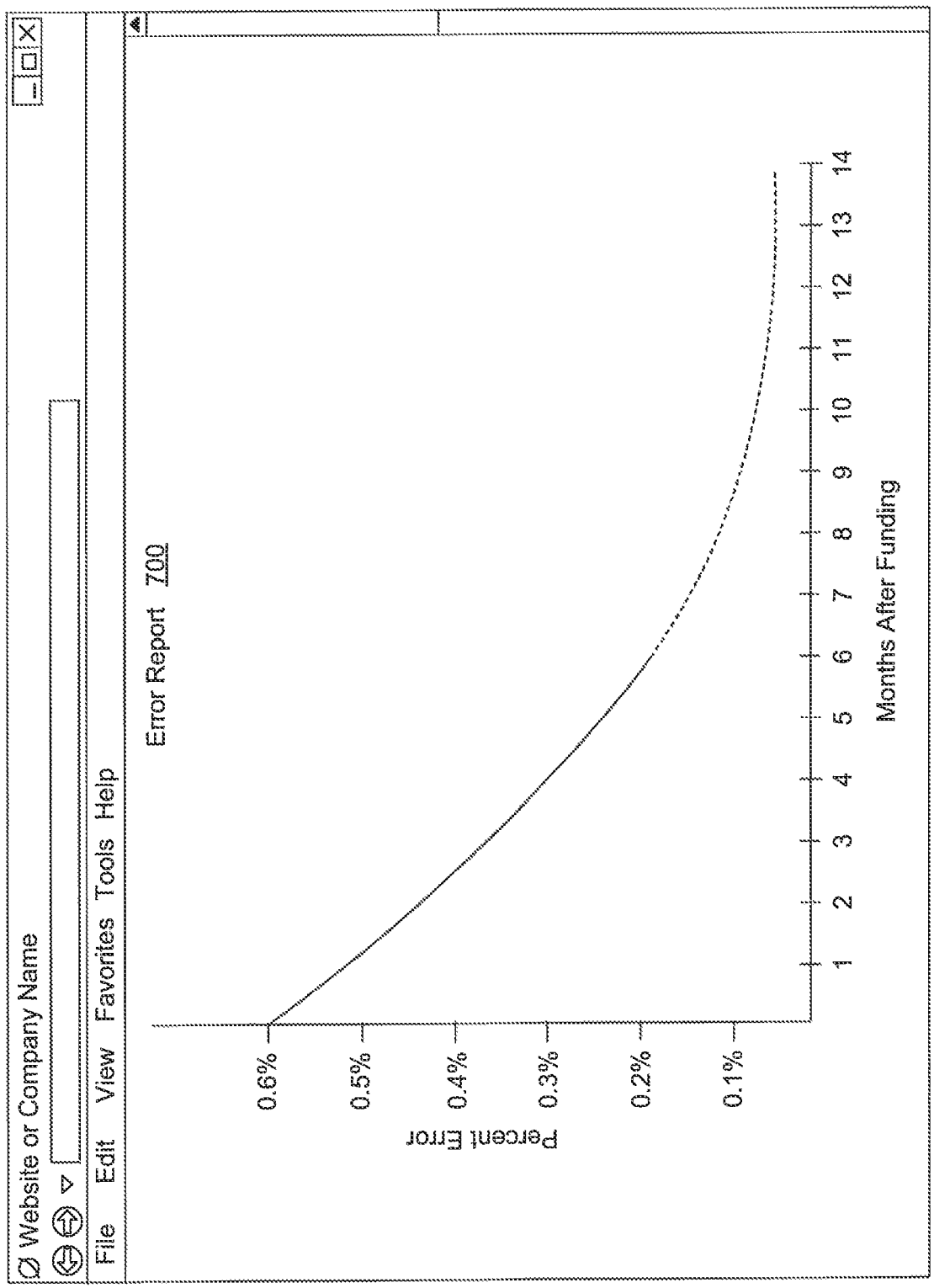
FIG. 7 illustrates an exemplary report, consistent with certain embodiments of the invention.

Data quality server may then provide the user with an error report 700, as shown in FIG. 7. The error rates for this report are much lower than those in error report 500, ranging no higher than 0.6%. This may be due to any number of factors, for example Lenders A and C may tend to provide particularly accurate data, loans between January 2006 and January 2009 may tend to be particularly accurate, or original LTV may be an attribute that lenders generally ensure is correct before providing the data to the GSE. Note, however, that in comparison to error report 500, error report 700 illustrates a more gradual rate in the reduction of errors as compared with the relatively steep curve of error report 500. This may be caused by a number of factors. For example, lenders may typically correct loan code errors in the first few months after funding, while not doing so for original LTV values. Alternatively, the GSE may internally process the LTV values to identify and correct errors without implementing similar processes for the loan codes.

Lender Breakouts

As discussed above, users can select aggregate lenders box 410 in report configuration page 400 so that data quality server 110 will generate a combined error report for all of the selected lenders. Alternatively, users can choose breakout lenders box 411 to view the error percentages for the lenders on an individual basis.

For example, the user at client terminal 150 may use report configuration page 400 to select rule 1 for loans originally funded from Jan. 1, 2009 through Dec. 31, 2009. The user may further choose to view only loans originally funded by lenders A and B, and choose breakout lenders box 411 so that they can compare the relative error rates of the two lenders. When the user selects generate report icon 407, data quality server 110 may generate a report such as error report 800, shown in FIG. 8.

Error report 800 includes two separate error curves, a dashed line 801 for lender A, and a solid line 802 for lender B. By viewing error report 800, a user at client terminal 150 may discern certain information about the data quality provided by the respective lenders. For example, lender A's error percentage is ultimately lower than that of lender B. However, lender A's error percentage in the first few months after funding is higher than that of lender B. This may reflect how lender A and lender B correct their data. Lender A may tend to consistently process their data over time to eliminate bad loan codes, whereas lender B may stop reviewing their data for errors after a certain amount of time has passed since the loans are originally funded, e.g., six months.

Thresholding of Error Rates

Figure 8:
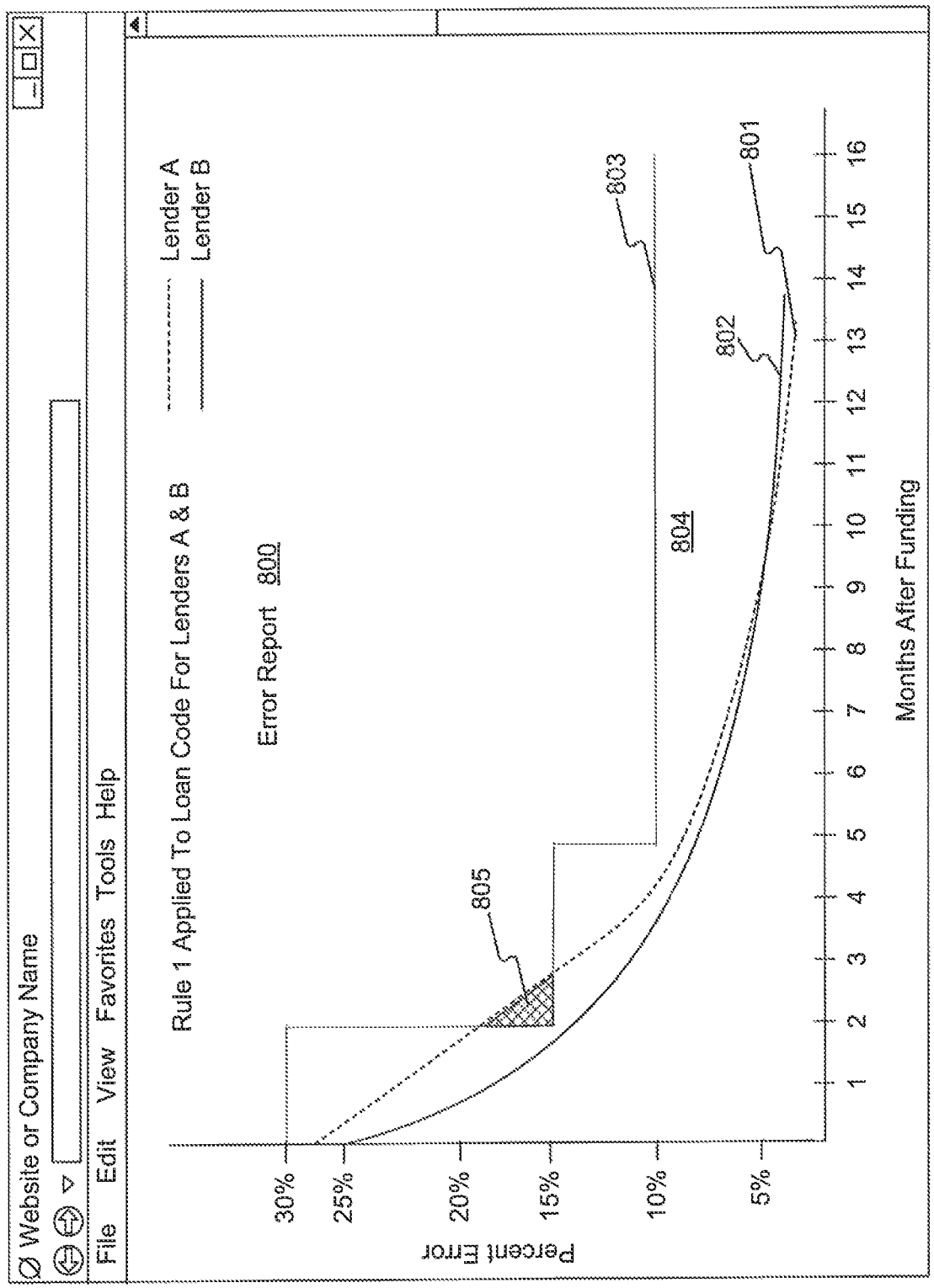
FIG. 8 illustrates an exemplary report, consistent with certain embodiments of the invention.

Error report 800 also illustrates an exemplary error thresholding technique. For example, error report 800 may include a threshold line 803, reflecting user-specified error thresholds for error rates. As shown in FIG. 8, threshold line 803 reflects a threshold of 30% for the error rate of loans during the first two months after funding, 15% for the next three months after funding, and 10% thereafter. By viewing error report 800, the user can see that lender A has exceeded the allowable error rate during a time identified by cross-hatched area 805. However, lender B's error rates stay below the allowable threshold rates, within area 804.

By allowing users to pre-configure error thresholds in the manner shown, users may specify certain conditions that lenders should meet for error rates. By setting the thresholds as shown in FIG. 8, the user may customize the error threshold for different periods after loans are initially funded. By decreasing the error thresholds as the number of months after funding increases, the lender is given some time after loans are initially funded to correct any errors in their loan codes. If the lender is not correcting the loan codes quickly enough, or is initially delivering loans with too many bad loan codes, this will be reflected in error report 800.

When a lender's error rate exceeds the allowable threshold, the user may also be provided with an indication that the lender has exceeded the threshold, for example by sending the user an email at client terminal 150 identifying the lender. This may allow the user to take steps to correct the issue, such as by contacting the lender to inform them that their error rates are unacceptable.

In some embodiments, the thresholds may be automatically set by quality engine 113. For example, the threshold for a given lender's loan codes may be set equal to the error percentage for the previous year's loan codes. By doing so, the threshold would only be exceeded when the lender's loan code data quality decreased from one year to the next. In some embodiments, a message may automatically be transmitted to client terminal 150 when the lender's loan code data quality decreases relative to the lender's previous year's loans. In still further embodiments, the thresholds may be set relative to the quality for all lenders for the previous year's loan codes, for example, using the average quality for all of the lenders. In such embodiments, the threshold would be exceeded only when the data quality from a particular lender fails to exhibit at least average quality relative to the other lenders.

In still further embodiments, the thresholds may be set based on a cost simulation. Taking active steps to correct loan codes, such as coordinating with the lender to review the loan codes delivered at any particular time, may have certain associated costs. Thus, while improving data quality of the loan codes may have financial benefits for the GSE, it may not always be cost-effective to take the necessary steps to correct errors. Data quality server 110 counts the frequency of correcting loan codes. The threshold may be set to a data error percentage where the cost of correcting the errors is at least equal to the cost of not correcting the errors. Thus, the threshold would only be exceeded, and the user at client terminal informed of the situation, when the error rate is sufficiently high that it is cost-effective to take the necessary steps to correct the loan codes.

Data quality server 110 may simulate the costs of data errors in the loan codes, for example by running a subset of business records 141 with a known loan code error percentage through the GSE's system for pricing the risk premium to be placed on loans acquired from a lender and given a performance guarantee in the issuance of a security backed by the loans. The threshold may be set to a data error percentage where the mispricing of the risk premium because of a subset of business records 141 with a loan error code percentage exceeds a materiality level defined in a business policy. Data quality server 110 would inform the user at client terminal when the error rate is sufficient high that it is necessary to take the necessary steps to correct the loan codes.

Vintage Breakouts

Figure 9:
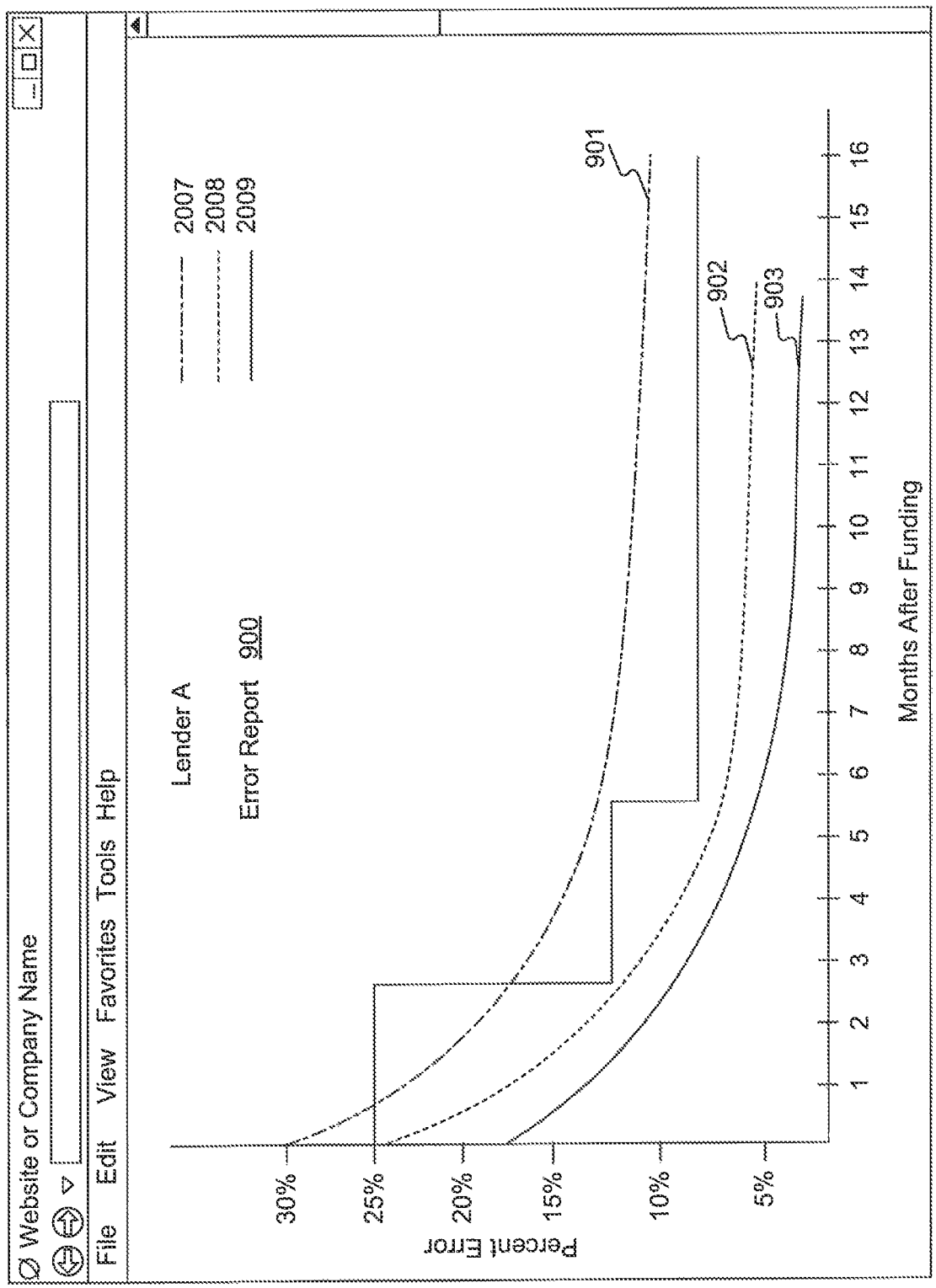
FIG. 9 illustrates an exemplary report, consistent with certain embodiments of the invention.

As shown in FIG. 9, data quality server 110 may also generate an error report 900 that breaks out the data quality based on the time when the loans were originally funded. Error report 900 represents the error percentage for loan codes for loans originally funded by lender A between 2007 and 2009. However, unlike FIG. 8, error report includes separate error curves 901, 902, and 903, for the years 2007, 2008, and 2009.

As can be seen from FIG. 8, lender A's error rates have decreased each year. Moreover, only the loans originally funded in 2007 (line 901) exceed the user-defined error thresholds. By viewing error report 900, the user at client terminal can determine how Lender A's error rates have performed over time. From FIG. 8, it is clear that, lender A's cumulative error rates exceed the allowable threshold, as represented by cross-hatched area 805. However, from FIG. 9, it is apparent that, in the two most recent years, 2008 and 2009, lender A's data quality has exhibited better performance.

Figure 10:
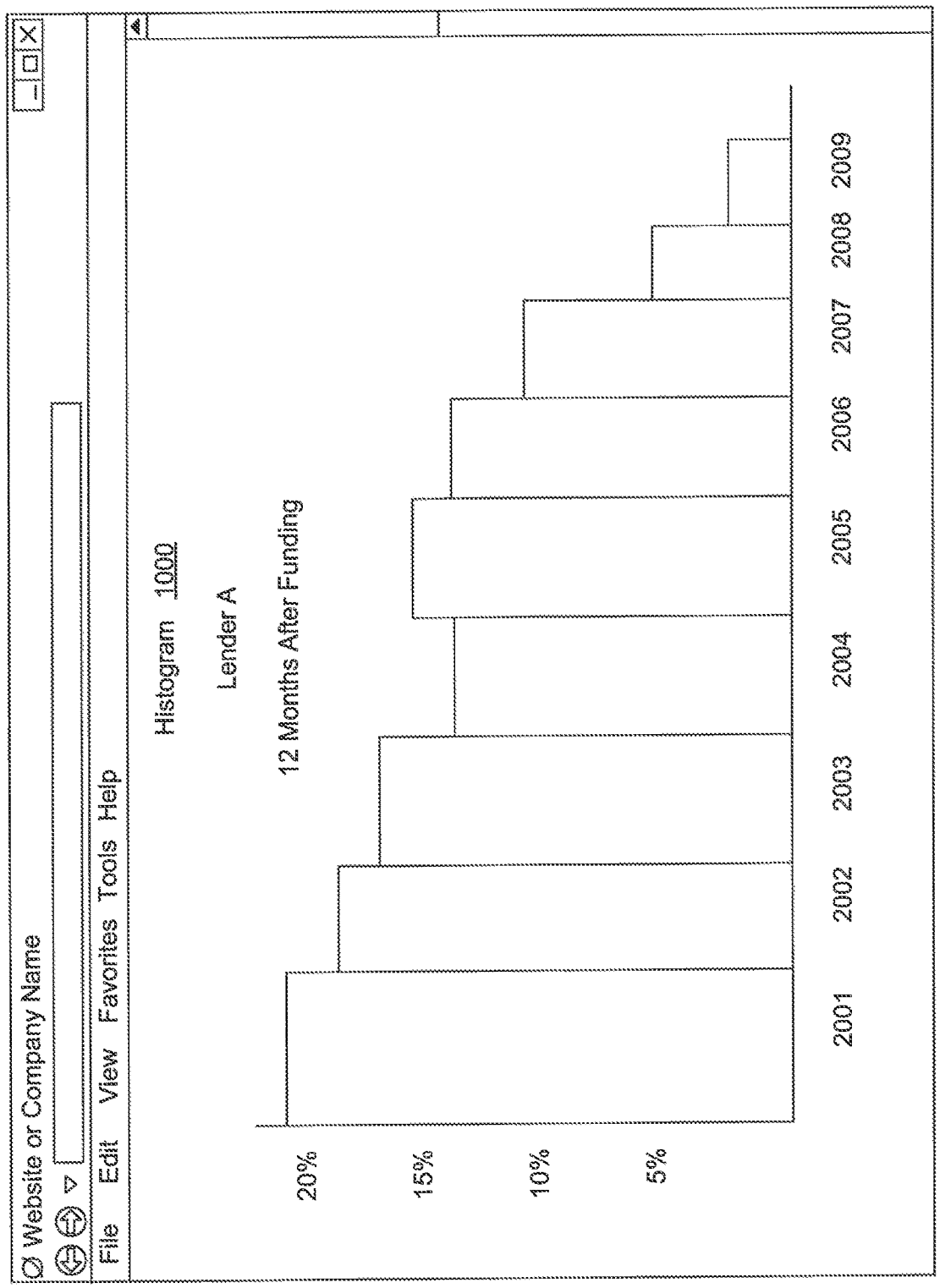
FIG. 10 illustrates an exemplary report, consistent with certain embodiments of the invention.

Data quality server may also provide other types of reports that provide insight into the performance of the data quality of business records 141. For example, FIG. 10 illustrates a histogram 1000, which illustrates the error percentage of loans originally funded by lender A at 12 months after funding, for loans originally funded from 2001 through 2009. As can be seen from FIG. 10, lender A's error percentages have generally decreased from 2001 through 2009. In some embodiments, users at client terminal 150 may use an interface (not shown) similar to report configuration page 400 to configure a request for a histogram such as histogram 1000. Moreover, the user may be provided with the ability to request reports for error percentages at different numbers of months after funding, for one or more lenders and/or rules, and also on an aggregate or individual basis.

Using the various reporting features discussed above, users can gain insight into how the data quality of business records 141 changes over time, for different lenders, by different rules, and based on the time when the loans were originally funded. Moreover, the user can see how data quality changes as time passes since the loans were originally funded, because the business records are processed and reported by the number of months after funding. Using these reports, users can identify data trends on a rule-by-rule or lender-by-lender basis. Moreover, the user can identify trends in how data quality is changing relative to the "vintage" of the data, e.g., the time when the loans were originally funded.

In still further embodiments, data quality can be analyzed as discussed above based on any loan attribute. For example, data quality can be analyzed for certain loan codes or for certain ranges of borrower income or original loan balance.

Moreover, in some embodiments, business records 141 may include additional loan attributes such as the geographical region where the loan was funded or the location of a property purchased with the loan (not shown). For example, business records 141 may include zip codes, census tract identifiers, metro area identifiers, or combinations of city/state. Users at client terminal 150 may request reports for particular areas, and can compare data quality and trends for different regions. In still further embodiments, the loans can be processed based on other geographical characteristics, such as whether the underlying properties are in rural or urban areas. In such embodiments, attribute values or data quality can be reported in the form of a color-coded map (not shown), where the colors represent certain attribute ranges or data quality percentages or other quality metrics for particular geographical regions. For example, a map could be generated illustrating the error percentage ½ life for any combination of rules and lenders. Such a map would provide the user with insight as to the loan quality for loans funded in different geographic regions.

Data Volatility

System 100 may also implement a method for evaluating data volatility of business records 141. "Data volatility" generally refers to the frequency with which an attribute changes values. Attributes may be considered relatively more volatile when they change more frequently than other attributes to which they are being compared. For example, an attribute that is expected to change every month after funding, such as current LTV 208, is expected to be more volatile than an attribute that is expected to remain static, such as loan code 203. Unlike data quality metrics, data volatility metrics do not necessarily reflect the "correctness" of a particular attribute, e.g., whether the attribute is consistent with a business rule. Rather, data volatility metrics reflect the frequency with which an attribute's value changes, independently of whether those changes are consistent with business rules for the attribute.

Figure 11:
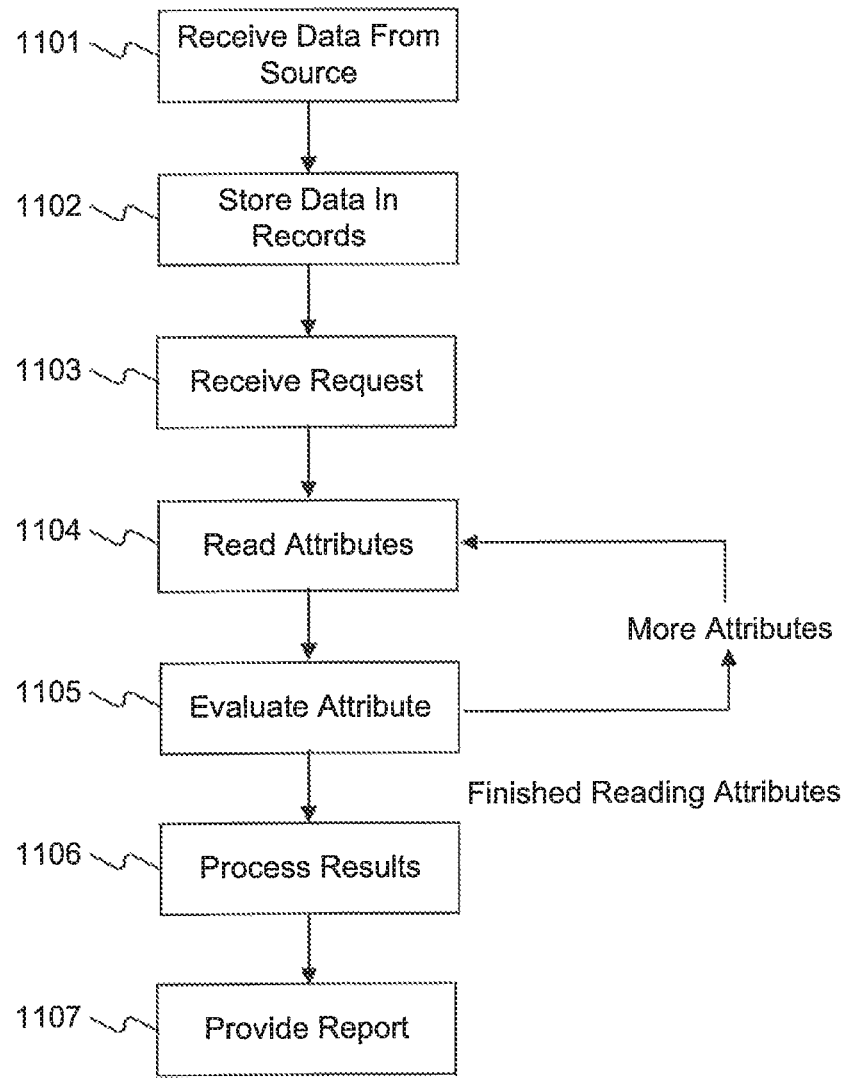
FIG. 11 illustrates a flowchart of an exemplary method, consistent with certain embodiments of the invention.

FIG. 11 illustrates an exemplary method 1100 for determining data volatility. Method 1100 begins with step 1101, receiving data from a data source. Step 1101 may be similar to step 601 discussed above with respect to method 600, e.g., receiving loan origination data from lenders A and B. Method 1100 then continues to step 1102, which likewise may be similar to step 602 discussed above, e.g., storing the loan origination data in business records 141.

Next, method 1100 moves to step 1103. In step 1103, the user at client terminal 1100 may request a data volatility report, using an interface similar to report configuration page 400 (not shown). As discussed above with respect to data quality reporting, the user may request a data volatility report for any combination of attributes and attribute values or ranges, and may request to have the report provide aggregate data quality or break out the data volatility by certain attribute values, e.g., by lender. However, note that in many embodiments, the user does not select rules when requesting a data volatility report. This is because the identified attributes are not being evaluated for conformance with user-defined rules, but rather for whether the attributes have changed over time, independent of whether the values have changed to or from "correct" values. For the purposes of this example, the user selects loans originated by lender A between 2007 and 2009, and requests a data volatility report for the loan code attribute with each year broken out separately in the report.

Next, method 1100 moves to step 1104, where database engine 111 of data quality server 110 reads the attributes identified by the user at step 1103 from business records 141. Step 1104 may be similar to step 606 of method 600, described above.

Next, method 1100 moves to step 1105, and the attributes read at step 1104 are evaluated for changes. For example, volatility engine 114 of data quality server 110 may process a change log of business records 141, to identify any changes to loan code 203 occurred for loans originated by lender A between 2007 and 2009. Volatility engine 114 may also determine how many months after funding each change to the loan code occurred. At this time, volatility engine 114 may store change data reflecting which loan codes changed, how many months after funding the loan codes changed, and when the loans with the changed loan codes were initially funded.

Next, method 1100 moves to step 1106, where volatility engine 114 may process the change data from step 1105 to determine the volatility of the loan code attribute for lender A's loans. For example, volatility engine 114 may determine that, in the first month after funding, 6% of the loans originated by lender A in 2007 had a change to the loan code, 3% of the loans funded in 2008, and 5% of the loans funded in 2009. At this time, volatility engine 114 may also determine the percentage of loan code attributes that changed for each year for subsequent months after funding.

Figure 12:
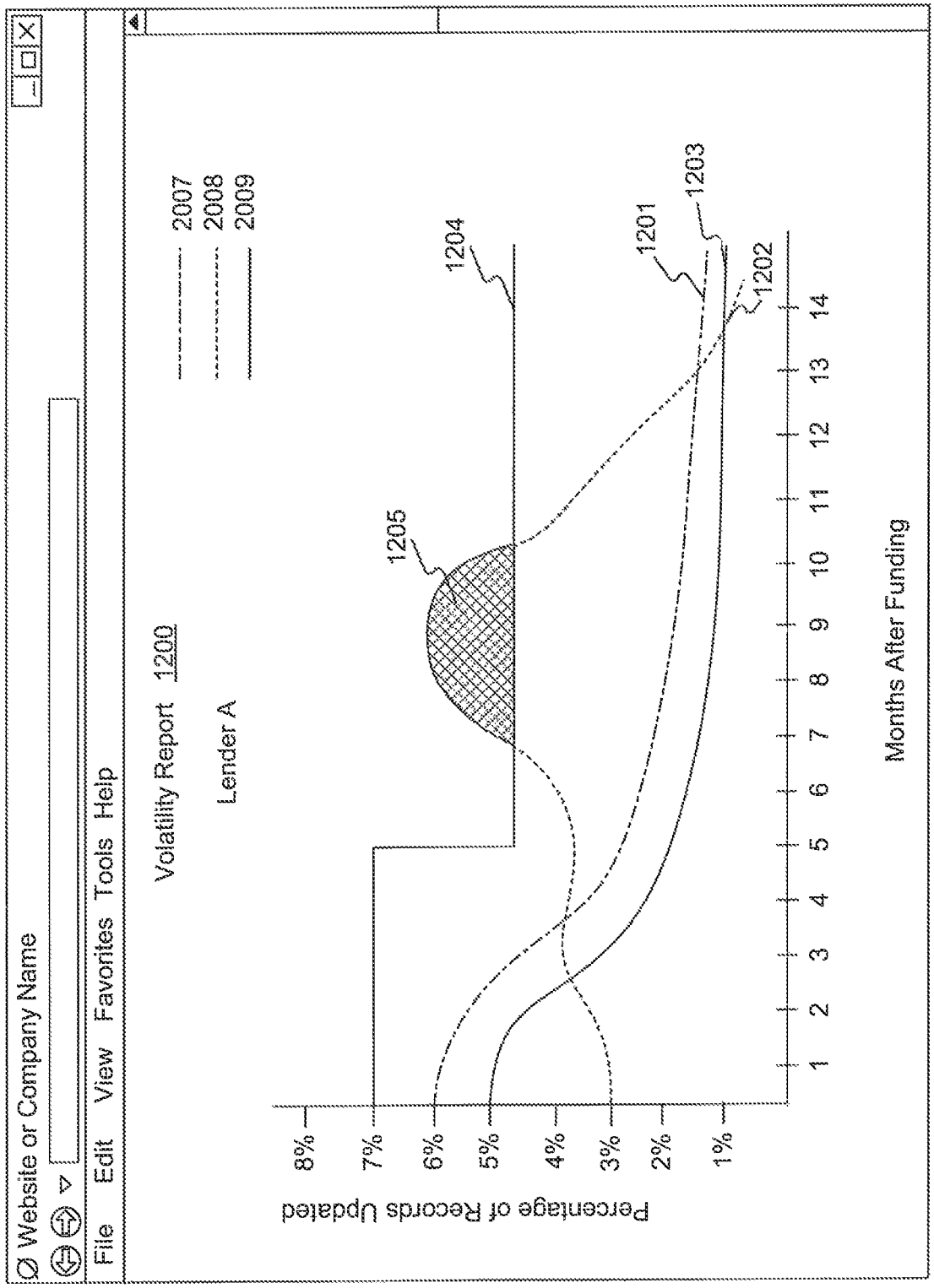
FIG. 12 illustrates an exemplary report, consistent with certain embodiments of the invention.

Next, method 1100 moves to step 1107, where report generator 115 generates a data volatility report for the user at client terminal 150. For example, report generator 115 may generate volatility report 1200, as shown in FIG. 12. Volatility report 1200 may include a volatility curve 1201 for the loans originally funded in 2007, a volatility curve 1202 for loans originally funded in 2008, and a volatility curve 1203 for loans originally funded in 2009. As can be seen from FIG. 12, the volatility of the loan codes for the loans funded in 2007 and 2009 generally decreases sharply after the first few months after funding. In contrast, the volatility of the loans originally funded in 2008 starts off low relative to the 2007/2009 loans, but increases dramatically during the period from 6-9 months after funding. In some embodiments, the user may also be provided with discrete data volatility values for the loan codes at a given period of time (e.g., a percentage volatility) or rate of change of the volatility (e.g., % volatility change per month).

Volatility report 1200 may also include a volatility threshold line 1204. As shown in FIG. 12, volatility threshold line 1204 starts at 7% until the fifth month after funding, and decreases to 5% thereafter. Volatility threshold line 1204 may reflect the expectation that lenders may identify incorrect loan codes after funding and thus need to update the loan codes, but the number of updates should be expected to decrease once the loans have been funded for five months. Cross-hatched region 1205 indicates an area where the volatility of loan codes for lender A for loans originated in 2008 exceeds the allowable volatility threshold. This may suggest that lender A was late in correcting any erroneous loan codes, i.e., that they did not deliver corrected loan codes quickly enough after the loans were originally funded.

Note that volatility reports may provide information about data quality that may be difficult to derive using user-defined rules. For example, in the above discussion of method 600, rule 1 was applied to business records 141, and any loans from lender A with a loan code of 1 were identified as "fail" results. However, in method 1100 discussed above, changes to the loan codes are identified regardless of whether the changes comply with any user-defined rules. Thus, while lender A is permitted to deliver loan codes with the values "2" and "3," but not "1," method 1100 would identify a change in the loan code attribute at step 1105 even if the loan code changed from a "2" to a "3," i.e., from one permissible value to another. In contrast, method 600 may not identify a loan code change from a "2" to a "3" as a "fail" result, because both values are consistent with business rule 1.

In some embodiments, step 1105 may be modified to evaluate attributes to determine whether they change by more than a particular amount. For example, Current LTV may be expected to change on a monthly basis, as the user pays off the loan by making regularly scheduled payments with a portion of the payments going to the loan principle. However, generally speaking, the current LTV % should not vary drastically from month to month, as most borrowers will make their required monthly payments without any large prepayments that would cause significant changes to the current LTV. Thus, it may be useful to evaluate business records 141 for any loans where the Current LTV changes more than 5% between any two months. A report such as volatility report 1200 could be generated by data quality server 110, and the volatility curves therein may represent the percentage of loans where the Current LTV changed more than 5% over any one-month period. Moreover, in further embodiments, users may be provided with an interface to define a selectable threshold, e.g. 5% or 10%, for evaluating the volatility of any particular attribute.

Data Analysis Using Data Quality and Data Volatility

Figure 13:
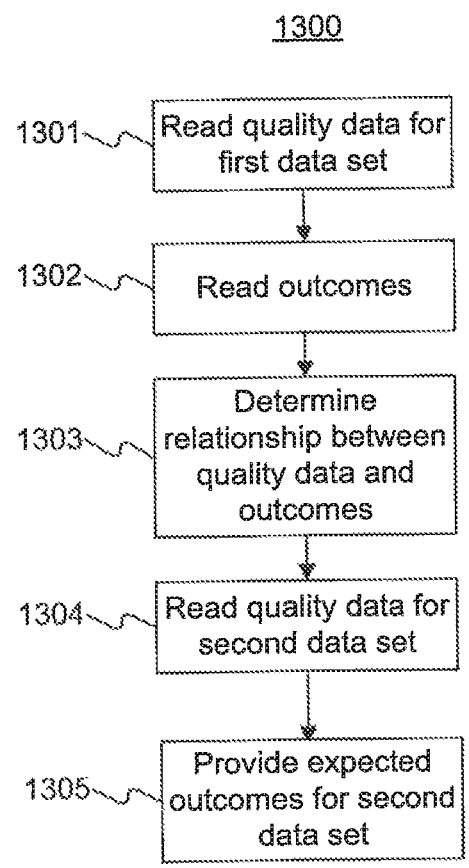
FIG. 13 illustrates a flowchart of an exemplary method, consistent with certain embodiments of the invention.

As discussed, data quality server 110 may also include an analysis engine 116. As shown in FIG. 13, analysis engine 116 may implement a method 1300 for determining a relationship between the data quality of attributes of business records 141 and outcomes associated with business records 141. For example, the outcomes may be future events such as the loans in business records 141 becoming delinquent. In such embodiments, analysis engine 116 may correlate data quality of an attribute (such as loan codes) for a data set with the number or percentage of loans that become delinquent. The outcomes may also be values of the loan attributes having errors, such as incorrect borrower incomes. In such embodiments, analysis engine 116 may correlate data quality of the loan codes to the number or percentage of loans with incorrect borrower incomes. Generally speaking, data quality of one or more attributes of business records 141 may correspond to various outcomes associated with the business records, including data quality of other loan attributes, volatility of other loan attributes, or future performance of the loans.

Method 1300 starts at 1301, where analysis engine 116 reads data quality metrics from quality engine 113, such as the data quality percentages discussed above with respect to method 600. For example, analysis engine 116 may read data quality for a first data set, such as all codes and lenders for loans funded within a five-year period, e.g., 2001-2005, for lenders A, B, C, D, E, and F. At this time, analysis engine 116 may also divide the loans into groups according to data quality for loan code attribute 203, on a lender-by-lender basis. For example, analysis engine 116 may determine that lenders A, B, and C had approximately 10% error rates in the loan code for the first month after funding, whereas lenders D, E, and F had error rates of approximately 20%.

Next, method 1300 moves to step 1302, where analysis engine 116 reads outcomes of the loans funded from 2001-2005. For example, analysis engine may determine the percentage of loans that defaulted in the first three years after funding for each lender. For the purposes of this example, 5% of loans from lenders A, B, and C defaulted in the first three years after funding, whereas 10% of loans from lenders D, E, and F defaulted in the first three years after funding.

Next, method 1300 moves to step 1303, where analysis engine 116 determines a relationship between the data quality for the first data set and the outcomes for the first data set. For example, analysis engine 116 may correlate the previous data quality of the loan codes to the outcomes, e.g., defaults. For example, analysis engine 116 may correlate the 10% error rate for lenders A, B, and C to the 5% default rate for these lenders, and the 20% error rate for lenders D, E, and F to the 10% default rate for these lenders. Thus, analysis engine 116 may determine that the average default rate is approximately half of the error rate for the loan codes, and store correlation data reflecting this result.

Next, method 1300 moves to step 1304, where analysis engine 116 reads data quality for a second data set, e.g., business records for lender G. For example, a user at client terminal 150 may request an expected default rate over the next three years for loans funded in 2009 by lender G. Analysis engine 116 reads quality data for the loan codes in the first month after funding for the loan codes delivered by lender G in 2009. For example, analysis engine 116 may read quality data from quality engine 113 indicating an 8% error rate for the loan codes.

Next, method 1300 moves to step 1305, where analysis engine 116 provides expected outcomes for the second data set, e.g., the lender G loans funded in 2009, using the relationship determined at step 1303. For example, since analysis engine 116 determined that the default rate was approximately half of the error rate for the previous loans for lenders A-F, analysis engine 116 may predict a default rate of approximately 4% for the lender G loans delivered in 2009. In some embodiments, analysis engine 116 may also transmit a report to client terminal 150 indicating the expected default rate.

In further embodiments, data quality for other attributes may be correlated to other outcomes. For example, errors in reported borrower income may be correlated to expected loan prepayments, using rule 4. As discussed above, loans where the borrower income is reported to be less than $10k or greater than $10,000,000 for loan codes 1-20 do not comply with rule 4. Loans with a reported borrower income of less than $10k may be associated with a decreased risk of loan prepayment, whereas loans with a reported income of greater than $10,000,000 may be associated with an increased risk of loan prepayment. Thus, the outcome of loan prepayment may be correlated by analysis engine 116 to the data quality of borrower income 205 for a group of previous loans to predict the likelihood that loans being evaluated by analysis engine 116 will be prepaid by the borrowers.

In still further embodiments, predicted data quality can be correlated to predicted outcomes. As discussed above with respect to method 600, regression or other techniques can be used to predict future data quality for various attributes, e.g., as shown in the dashed portion of quality curve 504. The predicted quality of a given attribute can also be correlated to expected future outcomes for the loans. For example, the error rates for lenders A, B, and C were 10% in the first month after funding in the example discussed above. These error rates may decline to 5% by 36 months after funding. Similarly, the error rates for lenders D, E, and F were 20% in the first month after funding in the example discussed above, and may have declined to 10% by 36 months after funding. By 36 months after funding, the default rates for these lenders in the following three years (e.g., from months 37-72) may be twice the error rates, e.g., 10% for lenders A, B, and C, and 20% for lenders D, E, and F.

However, to predict the default rate from months 37-72 for the loans for lender G that were funded in 2009 (assuming the loans are evaluated in January 2010) using the 36-month error rates discussed above may be impossible, because at most 12 months have not expired since the loans were originally funded. Instead, a predicted error rate for the lender G loans may be used, for example derived from the techniques discussed above with respect to method 600, e.g., by using regression or other techniques applied to the actual error rates for the lender G loans to calculate an expected 36-month error rate. Thus, for example, if the expected error rate at 36 months is 7%, the expected default rate would be 14%, e.g. twice the error rate, based on the correlation discussed above for the lender A-F loans.

In the examples discussed above, the error rates at one particular time period, e.g., 1 month after funding or 36 months after funding, were correlated to the default rate for the loans. In further embodiments, error rates over time can be correlated to expected default rates. For example, the average error rate for the lender A-F loans for a given period of time after funding can be correlated to the default rate at a subsequent period of time, e.g., an average error rate of 5% in the first five years after funding may correlate to a 7.5% default rate, e.g., a factor of 1.5. By doing so, an expected default rate for the lender G loans can be derived from actual or expected error rates for the lender G loans, for example by multiplying the actual or expected error rate for the first five years of the lender G loans by the factor of 1.5.

In some embodiments, analysis engine 116 may use data volatility, rather than data quality, to predict expected outcomes. To do so, analysis engine 116 may implement method 1300 as discussed above, only reading data volatility instead of data quality at step 1303 and correlating the data volatility rather than the data quality to the previous outcomes at step 1304. As an example, volatility of loan codes could be correlated with default risk in a manner similar to data quality, as discussed above. This may be caused by a situation where loans with higher volatility in the initial months have the higher volatility because the changes to the loan codes are fixing errors in the loan codes. In such a circumstance, volatility would also be correlated with data quality, e.g., high volatility of loan codes in the months shortly after funding may be correlated with decreasing error percentages for the loan codes.

Volatility may also be correlated with data quality in other ways. For example, business rule 5 states that the loan code must be a numeric value with no alphabetical or special characters. Thus, if a lender provides a loan with a loan code of "16x", the loan code does not comply with loan 5. If the correct loan code is actually "16" and the original loan balance is $500k, the loan does not comply with business rule 2, because business rule 2 requires that loans with a loan code between 1 and 20 do not exceed a $417k original balance. However, until the loan code is corrected, the loan will not "fail" business rule 2, because the loan code is not a value between 1 and 20.

Thus, if a number of such loans are delivered by lender A during a particular month, an initial analysis of data quality with respect to rule 2 may show that 90% of the loans comply with rule 2 (i.e., do not have a code between 1 and 20 and a balance greater than $417k), whereas 30% of the loans do not comply with rule 5, i.e., include an alphabetical or special character. However, during the six months after these loans are funded, all of the loan codes may be fixed by lender A, and thus all of the loan codes would comply with rule 5. This may result in "uncovering" more loans that do not comply with rule 2, because once the correct numerical loan codes are received, it may be that many of these loans have codes between 1 and 20 and balances greater than $417k. Thus, we would see increasing data quality with respect to rule 5, and decreasing data quality with respect to rule 2.

Moreover, the greater the number of loan codes that are corrected, the more rule 2 errors are susceptible to being "uncovered." Thus, analysis engine 116 may determine a correlation between increasing volatility of the loan code attribute with increasing data quality with respect to rule 5 (e.g., the loan codes are being fixed by the lender to numerical-only values), and decreasing data quality with respect to rule 2 (e.g., the errors "uncovered" by the corrected loan codes).

In still further embodiments, data volatility can be correlated to data quality to determine whether errors are introduced internally by the GSE, or externally by lenders. For example, assume the GSE has no internal business processes that track whether changes to business records 141 are introduced externally by the lenders, or internally by GSE users manipulating the data. However, lenders may typically introduce corrections to the loan data only within a certain time period after funding, for example, within six months after funding. Subsequent changes to the data may typically be caused by internal users at the GSE. Under such circumstances, data volatility in the first six months after funding may be correlated with increasing data quality for certain attributes (e.g., correcting loan codes to valid values under business rule 5). Data volatility in subsequent time periods may be correlated with decreasing data quality for the same attributes, as errors are introduced internally by the GSE.

As discussed above, data volatility in time frames shortly after funding may be more reflective of activity by the lenders than of internal activity by the GSE. Thus, if data quality decreases with increasing volatility for corresponding attributes shortly after funding, this may reflect errors introduced externally by the lenders. In contrast, if data quality decreases with increasing volatility for corresponding attributes well after the loan is funded, this may suggest the errors are introduced internally by the GSE.

In still further embodiments, data quality in one loan attribute may be correlated with data quality in other loan attributes. Generally speaking, lenders who report relatively "poor" data for one attribute may also tend to report relatively poor data for other attributes. As an example, lenders who report a high percentage of bad loan codes may also tend to report incorrect borrower incomes. For example, lenders A, B, and C may average 10% errors on loan codes when initially delivered, whereas lenders D, E, and F may average 20% errors on the loan codes. If lenders A, B, and C average 5% errors on borrower income and lenders D, E, and F average 10% errors on borrower income, this relationship suggests that the average borrower income errors are approximately half the loan code errors. As it may be more difficult to correctly identify errors in borrower incomes than loan codes, error rates for loan codes may be used as a proxy to estimate errors in borrower incomes. Thus, for a lender G who delivers loan codes with a 15% error, data quality server 110 may estimate a 7.5% error rate in reported borrower incomes for lender G. Processing such as that described above may be used to identify attributes that tend to have errors "clustered" with errors in other attributes. Likewise, volatility of a first attribute, such as loan codes, may also correlate to data quality for a second attribute, such as borrower income.

Exception Handling

As discussed above, when data quality or volatility for a particular attribute exceeds certain thresholds, users can be automatically informed by data quality server 110 that the threshold has been exceeded. As an example, certain loan codes, for example codes 1-10, may be associated with obligations of the lenders to pay fees to the GSE, whereas other loan codes, for example 11-20, may not require these fees. If lender A initially delivers a number of loans with codes 11-20, lender A would not be required to pay the fees for these loans. If at approximately six months after funding lender A suddenly provides updated loan codes between 1 and 10 for these loans, this raises a question of whether lender A has intentionally delivered bad loan codes to avoid paying the fees. For example, if the GSE's internal business processing does not include logic to retroactively bill lender A for the fees, lender A may avoid paying the fees altogether. Even if the GSE's internal business processing would ultimately catch the errors and bill lender A for the fees one year after funding, the GSE would potentially lose interest that could have been earned on the funds from the fees during the delay.

In order to more quickly identify a situation such as that described above, exception engine 117 may be configured to automatically transmit a message to client terminal 150 under certain circumstances. For example, a user at client terminal 150 could define a fraud alert exception that is triggered any time volatility for the loan code attribute exceeds 20% in the period between three and nine months after funding. Such processing may allow the user to identify potential fraud with the loan codes earlier than the GSE's internal business processing. Alternatively, a fraud alert exception could be defined that is triggered any time 20% of the loan codes change to a particular value or set of values, or change from a particular value or set of values to different values, such as changing from any loan code from 11-20 to any loan code from 1-10.

CONCLUSION

The foregoing description has been presented for purposes of illustration. It is not exhaustive and does not limit the invention to the precise forms or embodiments disclosed. Modifications and adaptations of the invention will be apparent to those skilled in the art from consideration of the specification and practice of the disclosed embodiments of the invention. For example, the described implementations include software, but systems and methods consistent with the present invention may be implemented as a combination of hardware and software or in hardware alone. Examples of hardware include computing or processing systems, including personal computers, servers, laptops, mainframes, micro-processors and the like. Additionally, although aspects of the invention are described as being stored in memory, one skilled in the art will appreciate that these aspects can also be stored on other types of computer-readable media, such as secondary storage devices, for example, hard disks, floppy disks, or CD-ROM, the Internet or other propagation medium, or other forms of RAM or ROM.

Computer programs based on the written description and methods of this invention are within the skill of an experienced developer. The various programs or program modules can be created using any of the techniques known to one skilled in the art or can be designed in connection with existing software. For example, program sections or program modules can be designed in or by means of Java, C++, HTML, XML, or HTML with included Java applets. One or more of such software sections or modules can be integrated into a computer system or existing applications, such as e-mail or browser software.

Moreover, while illustrative embodiments of the invention have been described herein, the scope of the invention includes any and all embodiments having equivalent elements, modifications, omissions, combinations (e.g., of aspects across various embodiments), adaptations and/or alterations as would be appreciated by those in the art based on the present disclosure. The elements in the claims are to be interpreted broadly based on the language employed in the claims and not limited to examples described in the present specification or during the prosecution of the application, which examples are to be construed as non-exclusive. Further, the steps of the disclosed methods may be modified in any manner, including by reordering steps and/or inserting or deleting steps, without departing from the principles of the invention.

It is intended, therefore, that the specification and examples be considered as exemplary only, with a true scope and spirit of the invention being indicated by the following claims and their full scope of equivalents.

What is claimed is:

1. A computer-implemented method, performed by a processor connected to a networked data quality server and a networked data repository server through a network interface, comprising:

receiving a request to predict future data quality of a plurality of loan records, wherein the plurality of loan records share a common attribute;

generating, by the processor in the networked data quality server, first consistency data for the common attribute, the first consistency data reflecting a first quality metric derived from evaluating first values of the common attribute corresponding to a first time period against a business rule for evaluating the common attribute, wherein the business rule defines value ranges for the common attribute;

generating, by the processor in the networked data quality server, second consistency data for the common attribute, the second consistency data reflecting a second quality metric derived from evaluating second values of the common attribute corresponding to a second time period against the business rule for evaluating the common attribute;

generating, by the processor in the networked data quality server, an indication of whether a threshold value has been exceeded based on the first consistency data and the second consistency data, wherein the threshold value is based on at least one of: a cost of correcting errors in at least one of the plurality of loan records which are not consistent with the business rule, or an analysis of historical loan code data quality or a cost simulation analysis;

generating, by the processor in the networked data quality server, based on evaluation of a change log of business records to identify changes to the loans, predicted data quality of the at least one of the plurality of loan records, wherein the predicted data quality is generated based on fitting a curve to data reflecting the actual frequency of changes of values of the common attribute between the first time period and the second time period; and transmitting the predicted data quality of the at least one of the plurality of loan records and a graph reflecting a difference between the first consistency data, second consistency data, and the threshold value from the first time period to the second time period, wherein transmitting the predicted data quality causes generating and displaying, by the processor in the network data quality server, the graph based on the business rule for evaluating the common attribute, and wherein transmitting the predicted data quality causes generating and displaying, by the processor in the network data quality server, for a predefined time period, a graphical representation of each of a measure of correlation between the predicted data quality, an error rate in the plurality of loan records, and an expected default rate for one or more loans corresponding to the plurality of loan records.

2. The computer-implemented method according to claim 1, further comprising providing a quality change rate of the common attribute to a display as a graph or as a numerical value representing a percentage change in the data quality from the first time period to the second period.

3. The computer-implemented method according to claim 1, further comprising:
displaying, on a user interface connected to the processor and network database, selectable options for identifying the business rule or values for the common attribute.

4. The computer-implemented method according to claim 3, wherein the user interface further comprises a selectable option for aggregating a quality rate for a plurality of business rules.

5. The computer-implemented method according to claim 3, wherein the user interface further comprises a selectable option for identifying a plurality of business rules.

6. The computer-implemented method according to claim 3, wherein the user interface further comprises a selectable option for aggregating quality rate for different values of the common attribute.

7. The computer-implemented method according to claim 3, wherein the user interface further comprises a selectable option for identifying different values for a first attribute of the loan records other than the common attribute, and individual quality rates for each identified value are provided to the display.

8. The computer-implemented method according to claim 7, wherein the first attribute is an identifier of a lender.

9. The computer-implemented method according to claim 7, wherein the first attribute represents a time period.

10. The computer-implemented method according to claim 1, further comprising:
determining an expected quality change rate for the common attribute.

11. The computer-implemented method according to claim 10, wherein the expected quality change rate is determined using a mathematical technique comprising one or more of time series analysis, logistic regression, exponential regression, or probit regression.

12. The computer-implemented method according to claim 1, wherein the cost is based on a loan error code percentage exceeding a predefined level.

13. A system comprising:
a processor having access to a networked data quality server and a networked data repository server;
a network interface in communication with the processor; and
a memory device in communication with the processor and configured to store instructions, wherein, when the processor executes the instructions, the processor:
receives a request to predict future outcomes of one or more loans corresponding to a plurality of loan records, wherein the plurality of loan records share a common attribute;
generates, in the networked data quality server, first consistency data for the common attribute, the first consistency data reflecting a first quality metric derived from evaluating first values of the common attribute corresponding to a first time period against a business rule for evaluating the common attribute, wherein the business rule defines value ranges for the common attribute;
generates, in the networked data quality server, second consistency data for the common attribute, the second consistency data reflecting a second quality metric derived from evaluating second values of the common attribute corresponding to a second time period against the business rule for evaluating the common attribute;
generates, in the networked data quality server, an indication of whether a threshold value has been exceeded based on the first consistency data and the second consistency data, wherein the threshold value is based on at least one of: a cost of correcting errors in at least one of the plurality of loan records which are not consistent with the business rule, or an analysis of historical loan code data quality or a cost simulation analysis;
generates, in the networked data quality server, based on evaluation of a change log of business records to identify changes to the loans, predicted data quality of the at least one of the plurality of loan records, wherein the predicted data quality is generated based on fitting a curve to data reflecting the actual frequency of changes of values of the common attribute between the first time period and the second time period; and
transmits the predicted data quality of the at least one of the plurality of loan records and a graph reflecting a difference between the first consistency data, second consistency data, and the threshold value from the first time period to the second time period, wherein transmitting the predicted data quality causes generating and displaying, by the processor in the network data quality server, the graph based on the business rule for evaluating the common attribute, and wherein transmitting the predicted data quality causes generating and displaying, by the processor in the network data quality server, for a predefined time period, a graphical representation of each of a measure of correlation between the predicted data quality, an error rate in the plurality of loan records, and an expected default rate for one or more loans corresponding to the plurality of loan records.

14. The system of claim 13, the instructions further executable by the processor to provide a quality change rate of the common attribute to a display as a graph or as a numerical value representing a percentage change in the data quality from the first time period to the second period.

15. The system of claim 13, the instructions further executable by the processor to display, on a user interface connected to the processor and network database, selectable options for identifying the business rule or values for the common attribute.

16. The system of claim 15, wherein the user interface further comprises a selectable option for aggregating a quality rate for a plurality of business rules.

17. The system of claim 15, wherein the user interface further comprises a selectable option for identifying a plurality of business rules.

18. The system of claim 15, wherein the user interface further comprises a selectable option for aggregating quality rate for different values of the common attribute.

19. The system of claim 15, wherein the user interface further comprises a selectable option for identifying different values for a first attribute of the loan records other than the common attribute, and individual quality rates for each identified value are provided to the display.

20. The system of claim 19, wherein the first attribute is an identifier of a lender.

21. The system of claim 19, wherein the first attribute represents a time period.

22. The system of claim 13, the instructions further executable by the processor to determine an expected quality change rate for the common attribute.

23. The system of claim 22, wherein the expected quality change rate is determined using a mathematical technique comprising one or more of time series analysis, logistic regression, exponential regression, or probit regression.

24. The system of claim 13, wherein the cost is based on a loan error code percentage exceeding a predefined level.

25. A non-transitory computer-readable storage medium storing processor-readable instructions, which when executed by a processor connected to a networked data quality server and a networked data repository server through a network interface, perform a method comprising:
  receiving a request to predict future outcomes of one or more loans corresponding to a plurality of loan records, wherein the plurality of loan records share a common attribute;
  generating, by the processor in the networked data quality server, first consistency data for the common attribute, the first consistency data reflecting a first quality metric derived from evaluating first values of the common attribute corresponding to a first time period against a business rule for evaluating the common attribute, wherein the business rule defines value ranges for the common attribute;
  generating, by the processor in the networked data quality server, second consistency data for the common attribute, the second consistency data reflecting a second quality metric derived from evaluating second values of the common attribute corresponding to a second time period against the business rule for evaluating the common attribute;
  generating, by the processor in the networked data quality server, an indication of whether a threshold value has been exceeded based on the first consistency data and the second consistency data, wherein the threshold value is based on at least one of: a cost of correcting errors in at least one of the plurality of loan records which are not consistent with the business rule, or an analysis of historical loan code data quality or a cost simulation analysis;
  generating, by the processor in the networked data quality server, based on evaluation of a change log of business records to identify changes to the loans, predicted data quality of the at least one of the plurality of loan records, wherein the predicted data quality is generated based on fitting a curve to data reflecting the actual frequency of changes of values of the common attribute between the first time period and the second time period; and
  transmitting the predicted data quality of the at least one of the plurality of loan records and a graph reflecting a difference between the first consistency data, second consistency data, and the threshold value from the first time period to the second time period, wherein transmitting the predicted data quality causes generating and displaying, by the processor in the network data quality server, the graph based on the business rule for evaluating the common attribute, and wherein transmitting the predicted data quality causes generating and displaying, by the processor in the network data quality server, for a predefined time period, a graphical representation of each of a measure of correlation between the predicted data quality, an error rate in the plurality of loan records, and an expected default rate for one or more loans corresponding to the plurality of loan records.

26. The non-transitory computer-readable storage medium of claim 25, the method further comprising providing a quality change rate of the common attribute to a display as a graph or as a numerical value representing a percentage change in the data quality from the first time period to the second period.

27. The non-transitory computer-readable storage medium of claim 25, the method further comprising:
  displaying, on a user interface connected to the processor and network database, selectable options for identifying the business rule or values for the common attribute.

28. The non-transitory computer-readable storage medium of claim 27, wherein the user interface further comprises a selectable option for aggregating a quality rate for a plurality of business rules.

29. The non-transitory computer-readable storage medium of claim 27, wherein the user interface further comprises a selectable option for identifying a plurality of business rules.

30. The non-transitory computer-readable storage medium of claim 27, wherein the user interface further comprises a selectable option for aggregating quality rate for different values of the common attribute.

31. The non-transitory computer-readable storage medium of claim 27, wherein the user interface further comprises a selectable option for identifying different values for a first attribute of the loan records other than the common attribute, and individual quality rates for each identified value are provided to the display.

32. The non-transitory computer-readable storage medium of claim 31, wherein the first attribute is an identifier of a lender.

33. The non-transitory computer-readable storage medium of claim 31, wherein the first attribute represents a time period.

34. The non-transitory computer-readable storage medium of claim 25, the method further comprising:
  determining an expected quality change rate for the common attribute.

35. The non-transitory computer-readable storage medium of claim 34, wherein the expected quality change rate is determined using a mathematical technique comprising one or more of time series analysis, logistic regression, exponential regression, or probit regression.

36. The non-transitory computer-readable storage medium of claim 25, wherein the cost is based on a loan error code percentage exceeding a predefined level.

* * * * *